US012392684B2

(12) United States Patent
Abbott, III et al.

(10) Patent No.: US 12,392,684 B2
(45) Date of Patent: Aug. 19, 2025

(54) MULTIMODE OPTICAL FIBER CORE CANE CLASSIFICATION METHOD

(71) Applicant: CORNING INCORPORATED, Corning, NY (US)

(72) Inventors: John Steele Abbott, III, Elmira, NY (US); Scott Robertson Bickham, Corning, NY (US); Amanda Lee Billings, Wilmington, NC (US); Ian David Cook, Wilmington, NC (US); Simit Mayank Patel, Greensboro, NC (US)

(73) Assignee: Corning Incorporated, Corning, NY (US)

( * ) Notice: Subject to any disclaimer, the term of this patent is extended or adjusted under 35 U.S.C. 154(b) by 531 days.

(21) Appl. No.: 17/951,695

(22) Filed: Sep. 23, 2022

(65) Prior Publication Data
US 2023/0094509 A1    Mar. 30, 2023

Related U.S. Application Data

(60) Provisional application No. 63/249,866, filed on Sep. 29, 2021.

(51) Int. Cl.
*G01M 11/02* (2006.01)
*B07C 5/342* (2006.01)
(Continued)

(52) U.S. Cl.
CPC ......... *G01M 11/0228* (2013.01); *B07C 5/342* (2013.01); *C03B 37/018* (2013.01);
(Continued)

(58) Field of Classification Search
CPC ... G01M 11/0228; G01M 11/30; B07C 5/342; C03B 37/018; C03B 37/0253;
(Continued)

(56) References Cited

U.S. PATENT DOCUMENTS

| 5,396,323 A | 3/1995 | Abbott et al. |
|---|---|---|
| 8,274,647 B2 | 9/2012 | Gholami et al. |

(Continued)

FOREIGN PATENT DOCUMENTS

WO    2007/043060 A1    4/2007

OTHER PUBLICATIONS

Abbott et al., "Fibers for Short-Distance Applications", Chapter 7 of the book Optical Fiber Telecommunications VIA, Elsevier, 2013, equations 7.5 and 7.6 pp. 243-282.
(Continued)

*Primary Examiner* — Md M Rahman
(74) *Attorney, Agent, or Firm* — Amy T. Lang

(57) ABSTRACT

Methods for classifying a core cane of an multimode optical fiber are disclosed. In embodiments, the method includes determining a relative refractive index profile $\Delta(r)$ of the core cane; fitting the relative refractive index profile $\Delta(r)$ to an alpha profile $\Delta_{fit}(r)$ defined by:

$$\Delta_{fit}(r) = \Delta_{o,fit}\left(1 - \left(\frac{r}{a_{fit}}\right)^{\alpha_{fit}}\right)$$

where $\Delta_{o,fit}$ is a relative refractive index at a longitudinal centerline of the core cane, $\alpha_{fit}$ is a core shape parameter, and $a_{fit}$ is an outer radius of the core cane; generating a non-alpha residual profile $\Delta_{diff}(r) = \Delta(r) - \Delta_{fit}(r)$ for the core cane; computing one or more metrics from $\Delta_{diff}(r)$, and using the one or metrics in a classification of the core cane, the classification comprising a prediction of whether a bandwidth at a pre-determined wavelength of an optical fiber drawn from a preform comprising the core cane exceeds a pre-determined bandwidth at the pre-determined wavelength.

20 Claims, 13 Drawing Sheets

(51) Int. Cl.
*C03B 37/018* (2006.01)
*C03B 37/025* (2006.01)
*C03B 37/027* (2006.01)
*G01M 11/00* (2006.01)

(52) U.S. Cl.
CPC ........ *C03B 37/0253* (2013.01); *C03B 37/027* (2013.01); *G01M 11/30* (2013.01); *G05B 2219/33189* (2013.01)

(58) Field of Classification Search
CPC .............. C03B 37/027; C03B 2203/23; C03B 2203/26; G05B 2219/33189; G02B 6/0288
USPC ........................................................ 356/73.1
See application file for complete search history.

(56) References Cited

U.S. PATENT DOCUMENTS

| | | |
|---|---|---|
| 8,322,166 B2 | 12/2012 | Bookbinder et al. |
| 8,385,702 B2 | 2/2013 | Bickham et al. |
| 8,406,592 B2 | 3/2013 | Abbott, III et al. |
| 9,481,599 B2 | 11/2016 | Bickham et al. |
| 9,989,458 B2 | 6/2018 | Cook et al. |
| 10,187,726 B2 | 1/2019 | Chang et al. |
| 2009/0016624 A1 | 1/2009 | Sung et al. |
| 2010/0315620 A1 | 12/2010 | Pimpinella et al. |
| 2012/0125053 A1 | 5/2012 | Bookbinder et al. |
| 2016/0123873 A1 | 5/2016 | Cook et al. |

OTHER PUBLICATIONS

International Search Report and Written Opinion of the International Searching Authority; PCT/US22/43193; mailed on Jan. 12, 2023, 10 pages; European Patent Office.
John A. Nelder, et al., "A simplex method for function minimization," Computer Journal, vol. 7, 1965, pp. 308-313.
Marcuse, "Principles of Optical Fiber Measurements", Academic Press, 1981, pp. 255-310.
Olshansky, R., "Propagation in Glass Optical Waveguides", Rev. Mod. Phys., vol. 51, No. 2, Apr. 1979, pp. 341-367.
Press, W. H., et al., "Section 10.5. Downhill Simplex Method in Multidimensions", Numerical Recipes: The Art of Scientific Computing (3rd ed.). New York: Cambridge University Press, 2007, pp. 402-406, ISBN 978-0-521-88068-8.
Snyder et al., "Optical Waveguide Theory", (Chapman and Hall, 1983) (eqn. 33-11 p. 643).

MULTIMODE OPTICAL FIBER CORE CANE CLASSIFICATION METHOD

This Application claims the benefit of priority to U.S. Provisional Patent Application Ser. No. 63/249,866 filed on Sep. 29, 2021, the content of which is relied upon and incorporated herein by reference in its entirety.

FIELD

The present specification generally relates to a method of classifying optical fiber preforms based on a relative refractive index profile of the preforms.

TECHNICAL BACKGROUND

Multimode fiber (MMF) is the primary optical transmission medium in data centers, and it has enjoyed increased use as the number and size of data centers have expanded. Multimode fibers are classified under certain ISO standards based on the effective modal bandwidth (EMB), which is measured in "frequency×distance" units, e.g., MHz·km. The classifications are referred to using the acronym OM (for "optical multimode"), with the present OM standards being OM1, OM2, OM3, OM4, and OM5. Each OM-standard fiber has different physical characteristics (e.g., core radius, cladding radius, relative refractive index profile, etc.) that result in different performance characteristics, including different EMBs.

The various design parameters that define an OM-standard fiber are not perfectly reproduced in the manufacturing process. This results in substantial variation in the performance of a given OM-standard fiber, particularly in the EMB. The EMB of a MMF is highly sensitive to the refractive index profile variations in the optical fiber. Accordingly, it is desirable when manufacturing a MMF to precisely measure the refractive index profiles of consolidated optical fiber preforms and to draw fiber using only the preforms with desired refractive index profiles. Existing optical fiber preform characterization techniques do not provide adequate metrics to optimize which optical fiber preforms are selected to generate MMFs at high yields that conform with OM standards.

SUMMARY

According to a first aspect, a method of classifying a core cane for use in forming a multimode optical fiber includes: determining a relative refractive index profile $\Delta(r)$ of the core cane; fitting the relative refractive index profile $\Delta(r)$ to an alpha profile $\Delta_{fit}(r)$ defined by:

$$\Delta_{fit}(r) = \Delta_{o,fit}\left(1 - \left(\frac{r}{a_{fit}}\right)^{\alpha_{fit}}\right)$$

where $\Delta_{o,fit}$ is a relative refractive index at a longitudinal centerline of the core cane, $\alpha_{fit}$ is a core shape parameter, and $a_{fit}$ is an outer radius of the core cane; generating a non-alpha residual profile $\Delta_{diff}(r) = \Delta(r) - \Delta_{fit}(r)$ for the core cane; computing one or more metrics from $\Delta_{diff}(r)$; and using the one or metrics in a classification of the core cane, the classification comprising a prediction of whether a bandwidth at a pre-determined wavelength of an optical fiber drawn from a preform comprising the core cane exceeds a pre-determined bandwidth at the pre-determined wavelength.

A second aspect includes the method according to the first aspect, wherein: the one or more metrics comprises one or more of: $\Delta_{diff-sum, neg} = \int_{r=0}^{r=x*\alpha_{fit}} \Delta_{diff, neg}(r) \, dr$, where x defines an analysis region and $\Delta_{diff, neg}$ is $\Delta_{diff}(r)$ multiplied by a weighting function z (r) that is 1 when $\Delta_{diff}(r)$ is negative and 0 when $\Delta_{diff}(r)$ is positive; $\Delta_{diff-sum, pos} = \int_{r=0}^{r=x*\alpha_{fit}} \Delta_{diff, neg}(r) \, dr$, where $\Delta_{diff, pos}$ is $\Delta_{diff}(r)$ multiplied by a weighting function y (r) that is 1 when $\Delta_{diff}(r)$ is positive and 0 when $\Delta_{diff}(r)$ is negative; a minimum negative value of $\Delta_{diff}(r)$ between r=0 and r=x*$a_{fit}$, $\Delta_{diff-neg, max}$; a maximum positive value of $\Delta_{diff}(r)$ between r=0 and r=x*$a_{fit}$, $\Delta_{diff-pos, max}$; and a weighted summation $\tau T_{err}$ computed by $\tau_{err} = \int_{r=0}^{\alpha_{fit}} g(r) * \Delta_{diff}(r) \, dr$, where g(r) is a predetermined weighting function; and comparing the one or more computed metrics with corresponding metrics associated with core canes known to form optical fibers having a bandwidth greater than a predetermined bandwidth at a predetermined wavelength.

A third aspect includes the method according to any of the preceding aspects, wherein the one or more metrics further comprise a magnitude metric $PW_{err}$ computed by:

$$PW_{err} = \frac{1000}{\Delta_{o,fit}} \frac{\int_0^{a_{fit}} \Delta_{fit}(r) * r * |\Delta_{diff}(r)| \, dr}{\int_0^{a_{fit}} \Delta_{fit}(r) * r \, dr}.$$

A fourth aspect includes the method according to any of the first through third aspects, wherein the computing one or more metrics from $\Delta_{diff}(r)$ comprises computing each one of $\Delta_{diff-sum, neg}$, $\Delta_{diff-sum, pos}$, the minimum negative value, the maximum positive value, and $T_{err}$.

A fifth aspect includes the method according to any one of the first through fourth aspects, wherein: the one or more computed metrics includes Terr, and the weighting function g(r) is selected such that $g(r) * \Delta_{diff}(r)$ estimates a difference between two mode group delays of an optical fiber produced from the core cane.

A sixth aspect includes the method according to any of the first through fifth aspects, wherein the comparing the one or more computed metrics with the values associated with the core canes used to form the optical fibers comprises determining that $\tau_{err}$ has a negative value.

A seventh aspect includes the method of any of the first through sixth aspects further comprising generating a classification scheme for core canes using values of the one or more computed metrics associated with core canes used to form a plurality of optical fibers.

An eighth aspect includes the method of any of the first through seventh aspects, wherein: the classification scheme comprises a plurality of bins, wherein each of the plurality of bins is defined by one or more numeral ranges associated with each of the one or more computed metrics, the plurality of bins comprises a highly rated bin generated using the values associated with the core canes used to form the optical fibers meeting the multimode fiber standard, and the comparing the one or more computed metrics with the values associated with the core canes used to form the optical fibers comprises determining whether the core cane satisfies the one or more numerical ranges associated with the highly rated bin.

A ninth aspect includes the method of any of the first through eighth aspects, further comprising: determining that the core cane does not meet the one or more numeral ranges associated with the highly rated bin; and discarding the optical preform.

A tenth aspect includes the method according to any of the first through ninth aspects, further comprising comparing the relative refractive index profile Δ(r) to a target refractive index profile that deviates from the alpha profile $\Delta_{fit}(r)$.

An eleventh aspect includes the method according to any of the first through tenth aspects, wherein the pre-determined bandwidth and the pre-determined wavelength are defined by a multimode fiber standard.

A twelfth aspect includes the method according to any one of the first through eleventh aspect, wherein the multimode fiber standard is an OM4 standard.

A thirteenth aspect includes the method according to any one of the first through twelfth aspects, wherein the fit for $\Delta_{fit}(r)$ is a least squares fit using a weighting function w(r) different from 1.

A fourteenth aspect includes the method according to nay of the first through thirteenth aspects, wherein the fit for $\Delta_{fit}(r)$ is a least squares fit using two weighting functions $w_1(r)$ and $w_2(r)$ and one or more metrics computed from $\Delta_{fit1}(r)$ and $\Delta_{fit2}(r)$ and comprises an alpha profile difference metric $\Delta_{diff}$ computed by:

$$\alpha_{diff} = \alpha_1 - \alpha_2$$

where $\alpha_1$ and $\alpha_2$ comprise different values of $\alpha_{fit}$ obtained using different weighting functions while fitting the relative refractive index profile Δ(r) to the alpha profile $\Delta_{fit1}(r)$ using $w_1(r)$ and $\Delta_{fit2}(r)$ using $w_2(r)$.

According to a fifteenth aspect, a method of fabricating a multimode optical fiber includes fabricating a core cane comprising an up-dopant concentration that varies from a centerline of the core cane to an outer radius of the core cane in accordance with a predetermined relative refractive index profile $\Delta_t(r)$ for the core cane; measuring a relative refractive index profile Δ(r) of the core cane; fitting the relative refractive index profile Δ(r) to an alpha profile $\Delta_{fit}(r)$ defined by $$\Delta_{fit}(r) = \Delta_{o,fit}\left(1 - \left(\frac{r}{a_{fit}}\right)^{\alpha_{fit}}\right)$$

where $\Delta_{o,fit}$ is a relative refractive index at the longitudinal centerline and $a_{fit}$ is an outer radius of the core cane; generating a non-alpha residual profile $\Delta_{diff}(r) = \Delta(r) - \Delta_{fit}(r)$ for the core cane; determining that the core cane meets one or more selection criteria based on $\Delta_{diff}(r)$, wherein the one or more selection criteria comprise one or more numerical ranges associated one or more of a plurality of selection parameters, wherein the plurality of selection parameters comprises: $\Delta_{diff-sum, neg} = \int_{r=0}^{r=x*a_{fit}} \Delta_{diff, neg}(r)\, dr$, where x defines an analysis region and $\Delta_{diff, pso}$ is $\Delta_{diff}(r)$ multiplied by a weighting function z (r) that is 1 when $\Delta_{diff}(r)$ is negative and 0 when $\Delta_{diff}(r)$ is positive; and $\Delta_{diff-sum, pos} = \int_{r=0}^{r=x*a_{fit}} \Delta_{diff,pos}(r)\, dr$, where $\Delta_{diff, pos}$ is $\Delta_{diff}(r)$ multiplied by a weighting function y (r) that is 1 when $\Delta_{diff}(r)$ is positive and 0 when $\Delta_{diff}(r)$ is negative; a minimum negative value of $\Delta_{diff}(r)$ between r=0 and r=x*$a_{fit}$, $\Delta_{diff-neg, max}$; a maximum positive value of $\Delta_{diff}(r)$ between r=0 and r=x*$a_{fit}$, $\Delta_{diff-pos, max}$; and a weighted summation $\tau T_{err}$ computed by $\tau_{err} = \int_{r=0}^{\alpha_{fit}} g(r)*\Delta_{diff}(r)\, dr$ $$\tau_{err} = \int_{r=0}^{\alpha_{fit}} g(r)*\Delta_{diff}(r)\, dr$$

where g(r) is a predetermined weighting function; and in response to determining that the core cane meets the one or more selection criteria, either discarding the core cane from further processing or selecting the core cane for the further processing into the multimode optical fiber.

A sixteenth aspect includes the method according to the fifteenth aspect, wherein the further processing comprises: depositing a cladding layer onto an exterior surface of the core cane to form a fiber pre-form; and drawing the fiber pre-form into the multimode optical fiber.

A seventeenth aspect includes the method according to any of the fifteenth through sixteenth aspects, wherein: the one or more selection criteria comprise a numerical range for $\tau_{err}$, and the weighting function g(r) is selected such that $g(r)*\Delta_{diff}(r)$ estimates a difference between two mode group delays of an optical fiber produced from the core cane.

An eighteenth aspect includes the method according to any of the fifteenth through sixteenth aspects, wherein the numerical range for $\tau_{err}$ comprises negative values, the negative values being associated with selecting the core cane for further processing into the multimode optical fiber.

A nineteenth aspect includes the method according to any of the fifteenth through eighteenth aspects, further comprising generating the one or more selection criteria by: fabricating a plurality of core canes; determining one or more of $\Delta_{diff-sum, neg}$, $\Delta_{diff-sum, pos}$, the minimum negative value, the maximum positive value, and $\tau_{err}$, for each of the plurality of core canes; processing each of the plurality of core canes to form a plurality of multimode optical fibers; determining which ones of the plurality of multimode optical fibers satisfy a multimode fiber standard, and establishing the one or more numerical ranges of the one or more selection criteria based on the ones of the plurality of multimode optical fibers that satisfy the multimode fiber standard.

A twentieth aspect includes the method according to any of the fifteenth through nineteenth aspects, wherein the multimode fiber standard is associated with OM4 fiber.

A twenty-first aspect includes the method according to any of the fifteenth through twentieth aspects, wherein the one or more selection criteria comprises a numerical range associated with each one of $\Delta_{diff-sum, neg}$, $\Delta_{diff-sum, pos}$, the minimum negative value, the maximum positive value, and $\tau_{err}$.

A twenty-second aspect includes the method according to any of the fifteenth through twenty-first aspects, wherein the one or more selection criteria further comprise a numerical range for a magnitude metric $PW_{err}$ computed by:

$$PW_{err} = \frac{1000}{\Delta_{o,fit}} \frac{\int_0^{a_{fit}} \Delta_{fit}(r)*r*|\Delta_{diff}(r)|\, dr}{\int_0^{a_{fit}} \Delta_{fit}(r)*r\, dr}.$$

A twenty-third aspect includes the method according to any of the fifteenth through twenty-third aspects, wherein the determining that the core cane meets one or more selection criteria based on $\Delta_{diff}(r)$ comprises classifying the core cane in accordance with a classification scheme comprising a plurality of bins, wherein each one of the plurality bins is associated with a set of numerical ranges for each of the one or more selection criteria.

A twenty-fourth aspect includes the method according to any of the fifteenth through twenty fourth aspects, wherein the predetermined relative refractive index profile $\Delta_t(r)$ deviates from the alpha profile $\Delta_{fit}(r)$.

A twenty-fifth aspect includes the method according to any of the fifteenth through twenty-fourth aspects, wherein the plurality of selection parameters comprises an alpha profile difference metric am computed by: $\alpha_{diff} = \alpha_1 - \alpha_2$ where $\alpha_1$ and $\alpha_2$ comprise different values of $\alpha_{fit}$ obtained using different weighting functions while fitting the relative refractive index profile $\Delta(r)$ to the alpha profile $\Delta_{fit}(r)$.

A twenty-sixth aspect includes a method of ranking a core cane among a plurality of optical core canes for use in forming a multimode optical fiber, the method comprising: determining a relative refractive index profile $\Delta(r)$ of the core cane; fitting the relative refractive index profile $\Delta(r)$ to an alpha profile $\Delta_{fit}(r)$ defined by $$\Delta_{fit}(r) = \Delta_{o,fit}\left(1 - \left(\frac{r}{a_{fit}}\right)^{\alpha_{fit}}\right)$$

where $\Delta_{o,\,fit}$ is a relative refractive index at a longitudinal centerline of the core cane; generating a non-alpha residual profile $\Delta_{diff}(r) = \Delta(r) - \Delta_{fit}(r)$ for the core cane; and classifying the core cane based on $\Delta_{diff}(r)$ by computing a plurality of selection parameters from $\Delta_{diff}(r)$, wherein the plurality of selection parameters comprises two or more of: $\Delta_{diff-sum,\,neg} = \int_{r=0}^{r=x*afit} \Delta_{diff,\,neg}(r)\,dr$, where x defines an analysis region and $\Delta_{diff,\,pos}$ is $\Delta_{diff}(r)$ multiplied by a weighting function z(r) that is 1 when $\Delta_{diff}(r)$ is negative and 0 when $\Delta_{diff}(r)$ is positive; and $\Delta_{diff-sum,\,pos} = \int_{r=0}^{r=x*afit} \Delta_{diff,pos}(r)\,dr$, where $\Delta_{diff,\,pos}$ is $\Delta_{diff}(r)$ multiplied by a weighting function y(r) that is 1 when $\Delta_{diff}(r)$ is positive and 0 when $\Delta_{diff}(r)$ is negative; a minimum negative value of $\Delta_{diff}(r)$ between $r=0$ and $r=a_{fit}$, $\Delta_{diff\,-neg,\,max}$; a maximum positive value of $\Delta_{diff}(r)$ between $r=0$ and $r=a_{fit}$, $\Delta_{diff-pos,\,max}$; and a weighted summation $\tau_{err}$ computed by $$\tau_{err}\int_{r=0}^{a_{fit}} g(r)*\Delta_{diff}(r)\,dr$$

where g(r) is a predetermined weighting function.

A twenty-seventh aspect includes the method according to the twenty-sixth aspect, wherein the plurality of selection parameters comprises a magnitude metric $PW_{err}$ computed by:

$$PW_{err} = \frac{1000}{\Delta_{o,fit}} \frac{\int_0^{a_{fit}} \Delta_{fit}(r)*r*|\Delta_{fit}(r)|\,dr}{\int_0^{a_{fit}} \Delta_{fit}(r)*r\,dr}.$$

A twenty-eighth aspect includes the method according to any of the twenty-fifth through twenty-seventh aspects, wherein the weighting function g(r) is selected such that $g(r)*\Delta_{diff}(r)$ estimates a difference between two mode group delays of an optical fiber produced from the core cane.

A twenty-ninth aspect includes the method according to any of the twenty-fifth through twenty eighth aspects, wherein the classifying the core cane based on $\Delta_{diff}(r)$ comprises selecting a bin from a plurality of bins based on the plurality of selection parameters, wherein each bin of the plurality of bins comprises a different set of numeral ranges for each of the plurality of selection parameters.

A thirtieth aspect includes the method according to any of the twenty-fifth through twenty-ninth aspects, wherein the plurality of selection parameters comprises an alpha profile difference metric $\alpha_{diff}$ computed by:

$$\alpha_{diff} = \alpha_1 - \alpha_2$$

where $\alpha_1$ and $\alpha 2$ comprise different values of $\alpha_{fit}$ obtained using different weighting functions while fitting the relative refractive index profile $\Delta(r)$ to the alpha profile $\Delta_{fit}(r)$.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
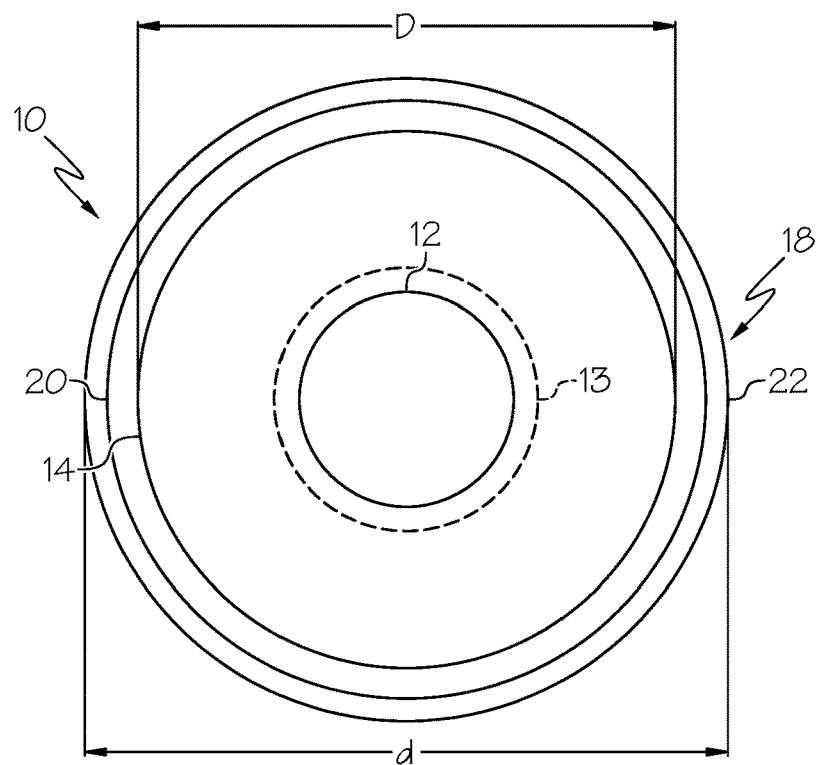
FIG. 1 schematically depicts a cross-sectional view of an optical fiber including a core region and a cladding region, according to one or more embodiments described herein.

Reference will now be made in detail to embodiments for ranking or classifying core canes for use in forming a multimode optical fiber. The ranking may be based on one or more metrics computed based on a non-alpha residual profile $\Delta_{diff}(r)$ for the core cane representing deviations of a relative refractive index profile $\Delta(r)$ of the core cane from an alpha profile $\Delta_{fit}(r)$. As described herein, the metrics described herein may quantify radial positions within the core cane at which the non-alpha residual profile $\Delta_{diff}(r)$ is positive or negative, as well as identify magnitudes of local maxima and minima of the non-alpha residual profile $\Delta_{diff}(r)$. The metrics described herein may also include a weighted summation of the non-alpha residual profile $\Delta_{diff}(r)$, with the weights being selected such that the weighted summation approximates a group mode delay difference that has been determined to differentiate between core canes resulting in multimode fibers (MMFs) conforming with a MMF standard and core canes resulting in MMFs not conforming with the MMF standard. Ranges associated with each of the metrics described herein may be grouped together and form classification bins used to rank a plurality of core canes. A highly-rated bin, for example, may be associated with a first set of ranges for the metrics determined to most likely result in a MMF conforming with the MMF standard, while a low rated bin may be associated with a second set of ranges for the metrics determined to be least likely to result in a MMF conforming with the MMF standard. Core canes determined to be in the low-rated bin may be discarded or not processed (e.g., provided with an outer cladding layer, drawn into an optical fiber, etc.) to save production costs associated with non-conforming fibers. Process variables such as the relative thickness of the overclad layer, the draw tension and the draw speed may also be selected or modified in real time based on the non-alpha residual profile $\Delta_{diff}(r)$ to improve the probability that fibers made from the core cane will conform to the MMF standard.

As used herein, the term "optical fiber preform" refers to a consolidated glass body formed during a process of fabricating an optical fiber prior to the consolidated glass body being drawn into a final form for incorporation into an optical fiber. Optical fiber preforms may include core canes. A core cane is a consolidated and drawn glass body that may or may not be formed from multiple layers of glass. For example, certain core canes may include an inner cladding layer disposed on an exterior surface of a core portion thereof. In such examples, the core portion may comprise a first dopant (e.g., an up-dopant such as Ge) and the inner cladding layer may comprise a second dopant (e.g., a down-dopant such as F).

As used herein, the term "MMF standard" refers to an industry OM standard (e.g., OM1, OM2, OM3, OM4, and OM5) providing requirements for MMFs (e.g., ISO/IEC 11801 and ANSA/TIA-568-C.3). The OM1-OM2-OM3 nomenclature is given in ISO/IEC 11801 most recently in 11801-1:2017. Each OM-standard fiber has different physical characteristics (e.g., core radius, cladding radius, relative refractive index profile, etc.) that result in different performance characteristics, including different effective modal bandwidths (EMBs). For example, MMF may be verified to meet the OM4 standard if it comprises a minimum EMB (=1.13*minEMBc) of 4700 MHzkm for a 850 nm laser source by performing an industry standard measurement referred to as a Differential Mode Delay, or "DMD measurement."

The phrase "relative refractive index," as used herein, is defined as:

$$\Delta(r)\% = 100 \times \frac{(n(r)^2 - n_{REF}^2)}{2 * n(r)^2} \quad (1)$$

where n(r) is a measured refractive index and the term $n_{REF}$ is the reference relative refractive index for the measurement. The refractive index and relative refractive index percent are measured at 800 nm unless otherwise specified. The reference relative refractive index corresponds to fused silica, which has a value of 1.453317 at 800 nm.

As used herein, the relative refractive index is represented by $\Delta$ and its values are given in units of "%," unless otherwise specified. In cases where the refractive index of a region is less than the reference index $n_{REF}$, the relative refractive index is negative and is referred to as a depressed region or depressed-index region, and the minimum relative refractive index of the region is calculated at the point at which the relative refractive index is most negative in the region, unless otherwise specified. In cases where the refractive index of a region is greater than the reference index $n_{REF}$, the relative refractive index is positive and the region can be said to be raised or to have a positive index.

The phrase "relative refractive index profile," as used herein, refers to the relative refractive index as a function of radial position within an optical fiber, core cane, or optical fiber preform. A relative refractive index profile for a fiber preform, core cane, or optical fiber may be expressed as $\Delta(r)$ to express a relative refractive index as a function of radial position relative to a centerline.

The term "$\alpha$-profile" or "alpha profile" refers to a fit to a relative refractive index profile of an optical fiber preform, expressed in terms of $\Delta_{fit}(r)$ which is in units of "%." For a profile segment beginning at the centerline of a fiber preform (i.e., r=0), the $\alpha$-profile has the form $$\Delta(r) = \Delta_0[1 - (|r|/\alpha_{fit})^\alpha], 0 \le r \le a \quad (2)$$

where $\Delta_o$ is the relative refractive index at the longitudinal centerline, a is an outer radius of the core of the MMF and $\Delta$ is a curvature of the core. The expression given by Equation 2 may be used to fit a core region of a measured refractive index profile over a radial region according to $$\Delta_{fit}(r) = \Delta_{0,fit}[1 - (|r|/\alpha_{fit})^{\alpha_{fit}}], \quad (3)$$

where $\Delta_{o,fit}$ is the relative refractive index at the longitudinal centerline (a fitting parameter), $a_{fit}$ is a fit outer radius of the core of the MMF and $\alpha_{fit}$ is a fit core shape parameter. The parameters $\Delta_0$, $a_{fit}$, and $\alpha_{fit}$ may be determined using the fitting techniques described herein. It should be understood that the Equations 2 and 3 may be used to characterize a refractive index profile of an optical fiber, a core cane, or an optical fiber preform. That is, Equations 2 and 3 may be used to characterize the relative refractive index profile at any step in a fabrication process in an optical fiber, including any combination of components or composition.

MMFs may propagate many modes. The majority of the optical power transmitted by the optical fiber is carried in the core region by higher order modes at wavelengths well-removed from their cutoff wavelength. These guided modes can be represented by a radial mode number m and an azimuthal mode number n. As used herein, the term "mode group" refers to collections of degenerate modes. Modes are said to be degenerate when they have the same, or substantially the same cutoff wavelength and propagation characteristics. A mode group is represented by an integer number, the principal mode number P, where P=2m+n+1.

As used herein, the term "EMBc" (or "calculated EMB") refers to constructing an output pulse using a weighted sum of DMD (differential mode delay) pulses. A single DMD for a fiber can be used to simulate the effect of different lasers by using different weighting functions. The term "minEMBc" (or "minimum calculated EMB") refers to the minimum EMBc of a set of 10 EMBc's generated with 10 different weighting functions as standardized by TIA/EIA 455-220A and IEC 60793-1-49. The EMB values are determined from DMD measurements and are related to the minimum of the EMBc values by a factor of 1.13 (i.e., minEMB=1.13×minEMBc).

Directional terms as used herein—for example up, down, right, left, front, back, top, bottom—are made only with reference to the figures as drawn and are not intended to imply absolute orientation.

As used herein, the singular forms "a," "an" and "the" include plural referents unless the context clearly dictates otherwise. Thus, for example, reference to "a" component includes aspects having two or more such components, unless the context clearly indicates otherwise.

Figure 2:
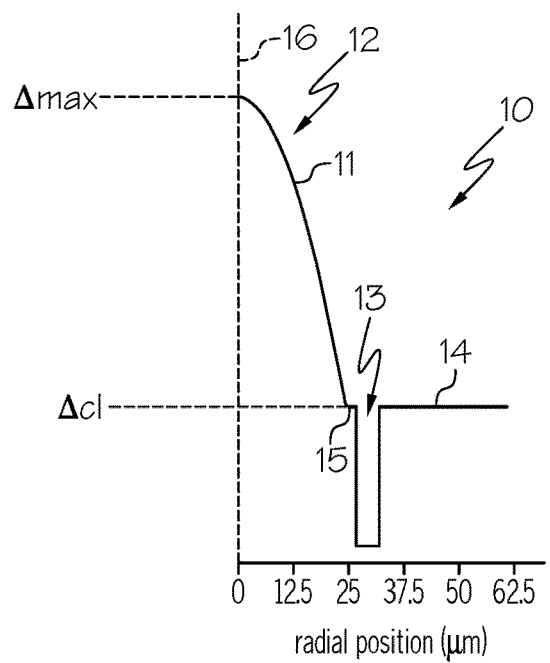
FIG. 2 schematically depicts a refractive index profile of the optical fiber of FIG. 1, according to one or more embodiments described herein.

Referring now to FIG. 1, cross sectional view of an optical fiber 10 is schematically depicted. In embodiments, the optical fiber 10 is a MMF comprising a core region 12, an inner cladding 13, an outer cladding 14, and a polymer coating 18 comprising primary coating layer 20 and secondary coating layer 22. FIG. 2 depicts an exemplary relative refractive index profile for the optical fiber 10 when the core region comprises a radius and a peak refractive index $\Delta_{max}$ in the core region 12. The outer cladding 14 comprises a relative refractive index $\Delta_{cl}$. The relative refractive index profile of FIG. 2 graphically represents $\Delta(r)$, which is the relationship between relative refractive index and radial distance "r" from a centerline 16. Accordingly, $\Delta_{max}$ represents the maximum relative refractive index (delta) of core region 12 in FIG. 1. The relative refractive index profile of standard multimode optical fibers comprises a graded index core (e.g. such that the relative refractive index profile of the core region 12 comprises an α-profile) and an outer cladding 14 with a constant refractive index $\Delta_{Cl}$. The core shape parameter α of the profile is typically about 2, depending on the wavelength for which the optical fiber is optimized. For example, α may have a value of about 2.12, or a value of about 2.10, or a value of about 2.06, a value of about 2.02, or a value of about 2.00. In embodiments, the core region 12 comprises a graded index portion 11 and an outer portion 15. The outer portion 15 is disposed between the graded index portion 11 and the inner cladding 13 and/or the outer cladding 14. Accordingly, it should be understood that the graded index portion 11 of the core region 12 extends from the centerline 16 of the fiber to the outer portion 15 of the core region 12. The outer portion 15 forms an offset between the graded index portion 11 of the core region 12 and the inner cladding 13 and/or the outer cladding 14. The inner radius of the outer portion 15 is equal to the radius of core region 12 and the outer radius of the outer portion 15 is equal to the inner radius of the inner cladding 13. The radial width of the outer portion 15 of the core region 12 may be in the range from 1 to 4 microns.

In embodiments, the optical fiber 10 described herein with respect to FIGS. 1 and 2 may be drawn from an optical fiber preform. For example, in embodiments, to fabricate the core region 12 of the optical fiber 10, an optical fiber core preform or core cane may be produced by chemical vapor deposition wherein precursor materials are reacted in a flame to generate and deposit silica-containing glass soot onto a target rod. The soot may comprise core glass soot, cladding glass soot, or both core and cladding glass soot. In an example, the core region 12 may be fabricated by depositing only core glass soot (e.g., soot doped with a suitable up-dopant to achieve the relative refractive index profile depicted in FIG. 2) on, for example, the target rod and subsequently consolidating and drawing the core glass soot. In embodiments, the core region 12 may include additional cladding soot to form the outer portion 15 between the graded index portion 11 and inner cladding 13. In embodiments, the target rod can be a ceramic (e.g. alumina) rod. Once the glass soot is deposited, the target rod is removed. The resultant soot body is porous and fragile. If needed, the porous body can be chemically dried (e.g. with a drying agent such as $Cl_2$) to remove water (typically in the form of the hydroxyl ion OH⁻), and is thereafter heated to consolidate the soot into a clear glass optical fiber preform.

In embodiments, dopants are incorporated into the precursor materials or soot prior to or during consolidation to adjust the refractive index of the deposited soot material and provide the relative refractive index profile $\Delta(r)$ depicted in FIG. 2. In embodiments, the core region 12 comprises silica doped with germanium, i.e. germania ($GeO_2$) doped silica. Dopants other than germanium such as $Al_2O_3$ or $P_2O_5$, singly or in combination, may be employed within the core region 12, and particularly at or near the centerline 16 of the optical fiber 10 to obtain the desired refractive index and density. In embodiments, the refractive index profile $\Delta(r)$ of the optical fiber 10 disclosed herein is non-negative between the centerline 16 of the optical fiber and the inner cladding 13. In embodiments, the optical fiber 10 contains no index-decreasing dopants in the core region 12.

In embodiments, during formation of the core region 12, the target rod may be removed and the fragile porous preform is thereafter heated to consolidate the porous preform into a solid, clear glass core preform. After consolidation, the core preform may then be heated in a furnace and drawn into a slender rod or core cane. The resultant rod can be segmented along the axial direction to form a plurality of individual core rods or core canes. In embodiments, each core cane may contain only core material (e.g., up-doped silica). In such a state, each core cane may be evaluated using the methods described herein to determine each core cane's suitability for further processing into optical fiber. In embodiments, after evaluation via the methods described herein, additional material, such as cladding material, may be added such that the core cane includes at least a portion of a cladding region. Once formed, the completed optical fiber preform comprising both core material and cladding material is drawn into an optical fiber comprising a core and one or more cladding layers surrounding the core. An apparatus that may be used to draw an optical fiber preform into the optical fiber 10 is described in greater detail herein with respect to FIG. 12.

Referring still to FIGS. 1 and 2, whether the optical fiber 10 meets a particular MMF standard may depend on the EMB of the optical fiber 10. The EMB of the optical fiber 10 is highly sensitive to the refractive index profile variations in the optical fiber 10. If a relative refractive index profile $\Delta(r)$ of a particular optical fiber significantly deviates from that of the optical fiber 10 shown in FIG. 2, for example, the optical fiber may not meet a particular MMF standard (e.g., OM4). The relative refractive index profile $\Delta(r)$ of a particular optical fiber may vary depending on the dopant concentration distribution within a core cane used to form that optical fiber. Accordingly, it is desirable, in the manufacturing of MMFs, to precisely measure the refractive index profiles of consolidated optical fiber preforms such as core canes and to draw fiber using only the preforms with the desired refractive index profiles. In addition, the information contained in the measured refractive index profile can be fed back to the preform soot laydown process to vary soot deposition conditions to maximize the rate of production of high quality fiber preforms while minimizing waste. This maximizes the yields of high quality optical fibers.

In view of the foregoing, a core cane used to form, for example, the core region 12 of the optical fiber 10, may be pre-evaluated prior to performance of additional process steps (e.g., deposition of cladding material thereon and drawing into an optical fiber) thereon. The evaluation may include computing one or more metrics based on a non-alpha residual profile $\Delta_{diff}(r)$ for the core cane representing deviations of a relative refractive index profile $\Delta(r)$ of the core cane from an alpha profile $\Delta_{fit}(r)$, as defined by Equation 2 herein. To generate the alpha profile $\Delta_{fit}(r)$, the relative refractive index at a plurality of different radial positions within a core cane may be initially measured. Such relative refractive index measurements may be conducted via any suitable measurement technique. For example, in embodiments, the relative refractive index profile $\Delta(r)$ of a particular core can may be determined by scanning an optical beam through the core cane and measuring the deflection angle of the refracted optical beam exiting the preform at a plurality of different orientations. In embodiments, the measurement techniques employed in U.S. Pat. No. 9,989,458 B2, entitled "High Precision Measurement of Refractive Index Profile of Cylindrical Glass Bodies," filed on Oct. 30, 2015, hereby incorporated by reference in its entirety, may be used to measure a relative refractive index profile $\Delta(r)$.

In embodiments, after a relative refractive index profile $\Delta(r)$ for a particular core cane is measured, the relative refractive index profile $\Delta(r)$ is fit to an alpha profile $\Delta_{fit}(r)$ defined in Equation 3 herein using a suitable fitting technique. A least squares fitting technique or other suitable fitting algorithm may be employed to generate the alpha profile $\Delta_{fit}(r)$. For example in embodiments, an iterative least squares fitting technique may be applied. Then initial values of the maximum relative refractive index $\Delta_{o,fit}$, $\alpha_{fit}$, and $a_{fit}$ are obtained (e.g., $\Delta_{o,int}$, $\alpha_{int}$, and $\alpha_{int}$) from inspection of an initial relative refractive index profile $\Delta(r)$ of a core cane ($\alpha_{o,int}=\Delta_{max}$, of the core cane, $\alpha_{int}=2.1$, and $a_{int}$=an outer radius of a core cane) and used to create a trial function $\Delta_{trial}(r)$ between r=0 and r=$a_{int}$ having the form of Equation 2 herein, with the $\Delta_{o,fit-int}$, $\alpha_{int}$, and $a_{int}$ substituted therein. The fitting technique may select the values for $\Delta_{o,fit}$, $\alpha_{fit}$, and $a_{fit}$ that minimize a least squares error $\chi^2$:

$$\chi^2=\Sigma_{i=1}^M w(r_i)*(\Delta_{trial}(r_i)-\Delta(r_i))^2 \quad (4)$$

where M is the number of data points of the measured relative refractive index profile $\Delta(r)$ and $w(r_i)$ is a weighting function. That, is, in order to determine an alpha profile $\Delta_{fit}(r)$ for a particular core cane, Equation 4 herein may be minimized using a suitable curve fitting technique such as the Nelder-Mead algorithm (Nelder, John A. and R. Mead, "A simplex method for function minimization," *Computer Journal* 7: 308-313 (1965), which is incorporated herein by reference as though fully set forth in its entirety. Press, William H. and Teukolsky, Saul A. Numerical Recipes: The Art of Scientific Computing (Cambridge Univ Press, 1986 and later editions), Section 10.4 pp. 289-293), which is incorporated herein by reference as though fully set forth in its entirety, may be used to identify values for $\Delta_{o,fit}$, $a_{fit}$, and $\alpha_{fit}$ that minimize the least squared error, as defined above in Equation 4 above. Any particular weighting scheme may be used in the least squares fitting method. The Nelder-Mead algorithm or an equivalent iterative approach is utilized because the function in Equation 2 is nonlinear, and in the preferred embodiment the weight function in Equation 4 (further specified in Equation 5 below) depends on one or more of the fitting parameters and hence varies slightly with each iteration. In embodiments, the weighting function $w(r)$ in Equation 4 may exclude or de-emphasize radial regions where the measurement accuracy is low or there are known "non-alpha" errors (for example, when a centerline dip or peak is present) in the refractive index profile by selection of a fitting region. In embodiments, a particular weighting function $w(r_i)$ utilized within Equation 4 may be zero outside of a fitting region and be non-zero or vary as a function of radial position within the fitting region. The relationships between refractive index errors and "alpha error" and "non-alpha errors" is known to those skilled in the art, and is described in Marcuse, Principles of Optical Fiber Measurements, pp. 255-310, (Academic Press, 1981), which is incorporated herein by reference as though fully set forth in its entirety, and to Olshansky, R., "Propagation in Glass Optical Waveguides," Rev. Mod. Phys., Vol. 51, No. 2, April 1979, pp. 341-367, which is incorporated herein by reference as though fully set forth in its entirety.

Figure 3A:
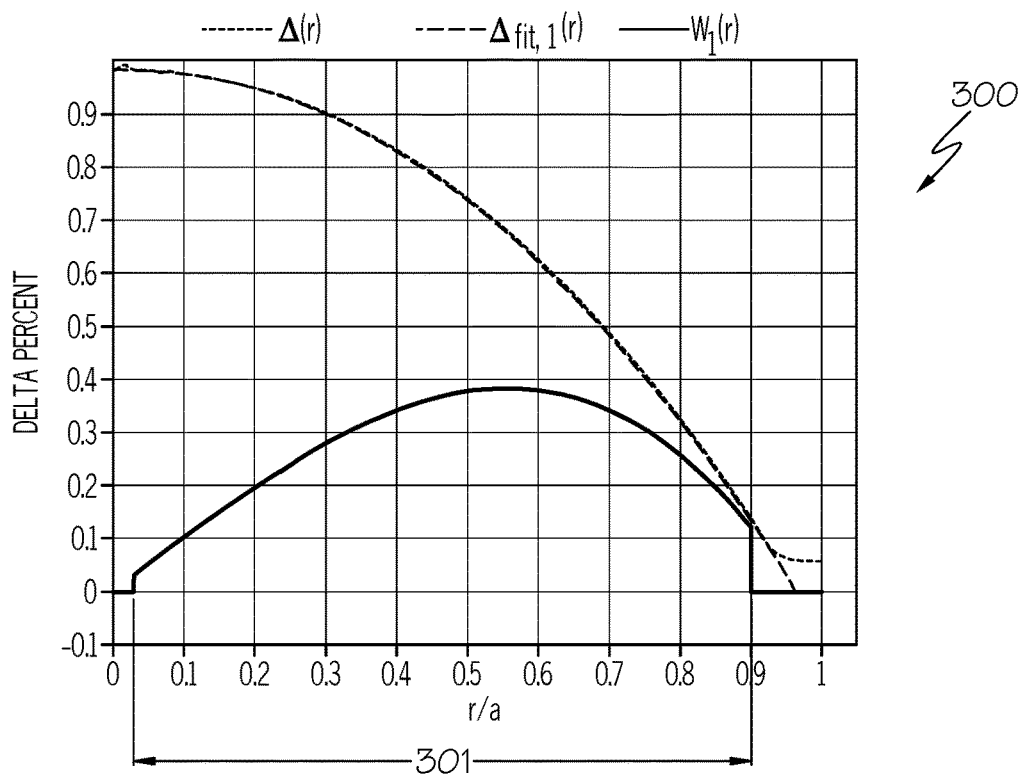
FIG. 3A depicts a plot of a relative refractive index profile of a core cane, an alpha fit for the relative refractive index profile, and a weighting function used to determine the alpha fit, according to one or more embodiments described herein.
Figure 3B:
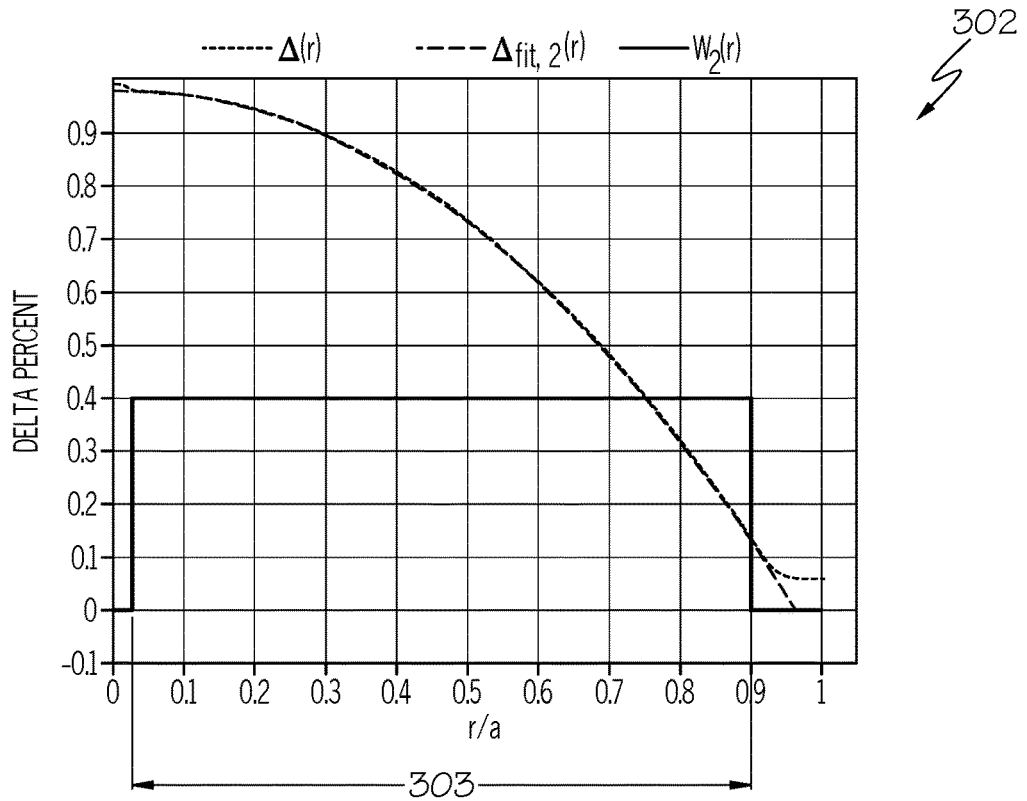
FIG. 3B depicts a plot of the relative refractive index profile of the core cane of FIG. 3A, a second alpha fit for the relative refractive index profile, and a second weighting function used to determine the second alpha fit, according to one or more embodiments described herein.

FIGS. 3A and 3B depict examples of two alternative weighting functions $w_1(r_i)$ and $w_2(r_i)$ that may be input into Equation 4 during the process of computing $\Delta_{fit}(r)$ for a particular optical fiber preform. It should be understood that the weighting functions $w_1(r_i)$ and $w_2(r_i)$ depicted in FIGS. 3A and 3B are only two examples of weighting functions that may be used to determine $\Delta_{fit}(r)$ and that the present disclosure is not limited to the use of any particular weighting function. FIGS. 3A-3B depict plots 300 and 302, respectively, of the relative refractive index profile $\Delta(r)$ associated with the same core cane. The relative refractive index profile $\Delta(r)$ is fit to two different alpha profiles $\Delta_{fit,1}(r)$ (FIG. 3A) and $\Delta_{fit,2}(r)$ (FIG. 3B) using two different weighting functions $w_1(r_i)$ and $w_2(r_i)$. FIGS. 3A and 3B each show the different weighting functions $w_1(r_i)$ and $w_2(r_i)$ used to compute the different alpha profiles $\Delta_{fit,1}(r)$ and $\Delta_{fit,2}(r)$ shown therein. In FIG. 3A, the weighting function $w_1(r_i)$ may be expressed as $$w_1(r) = \frac{r}{a_{fit,k}} * \left(1 - \left(\frac{r}{a_{fit,k}}\right)^2\right) \quad (5)$$

within a fitting region 301 and be equal to zero outside of the fitting region 301. In Equation 5, the $a_{fit, k}$ value represents a value for $a_{fit}$ of a particular iteration k of the fitting method (k=1,2,3, . . . ) being used. For example, during an initial iteration, the value $a_{int}$ associated with the initial estimate may be input into Equation 5 and updated until constraints of the particular fitting algorithm being used are satisfied. In FIG. 3B, the weighting function $w_2(r_i)$ is uniform (e.g., $w_2(r_i)=1$) throughout a fitting region 303 and equal to zero outside of the fitting region 303. In both FIGS. 3A and 3B, data near the radial center of the core cane and the outer radius are excluded by selection of the fitting regions 301 and 303, respectively. The fitting regions 301 and 303 may be selected to exclude measured relative refractive index values associated with central and outermost portions of the core cane, as such portions may tend to include non-alpha errors. As depicted in FIGS. 3A and 3B, irrespective of the weighting function used, the relative refractive profile $\Delta(r)$ associated with the measured core cane deviates from the alpha profile. That is, the relative refractive index profile $\Delta(r)$ comprises a non-alpha component. It has been observed that such a non-alpha component may be difficult to cancel out via adjusting downstream tension during drawing using the techniques described in U.S. Pat. No. 8,322,166 B2, hereby incorporated by reference in its entirety, which have previously been employed to adjust the $\alpha$ value that fits the relative refractive index profile $\Delta(r)$.

Figure 3C:
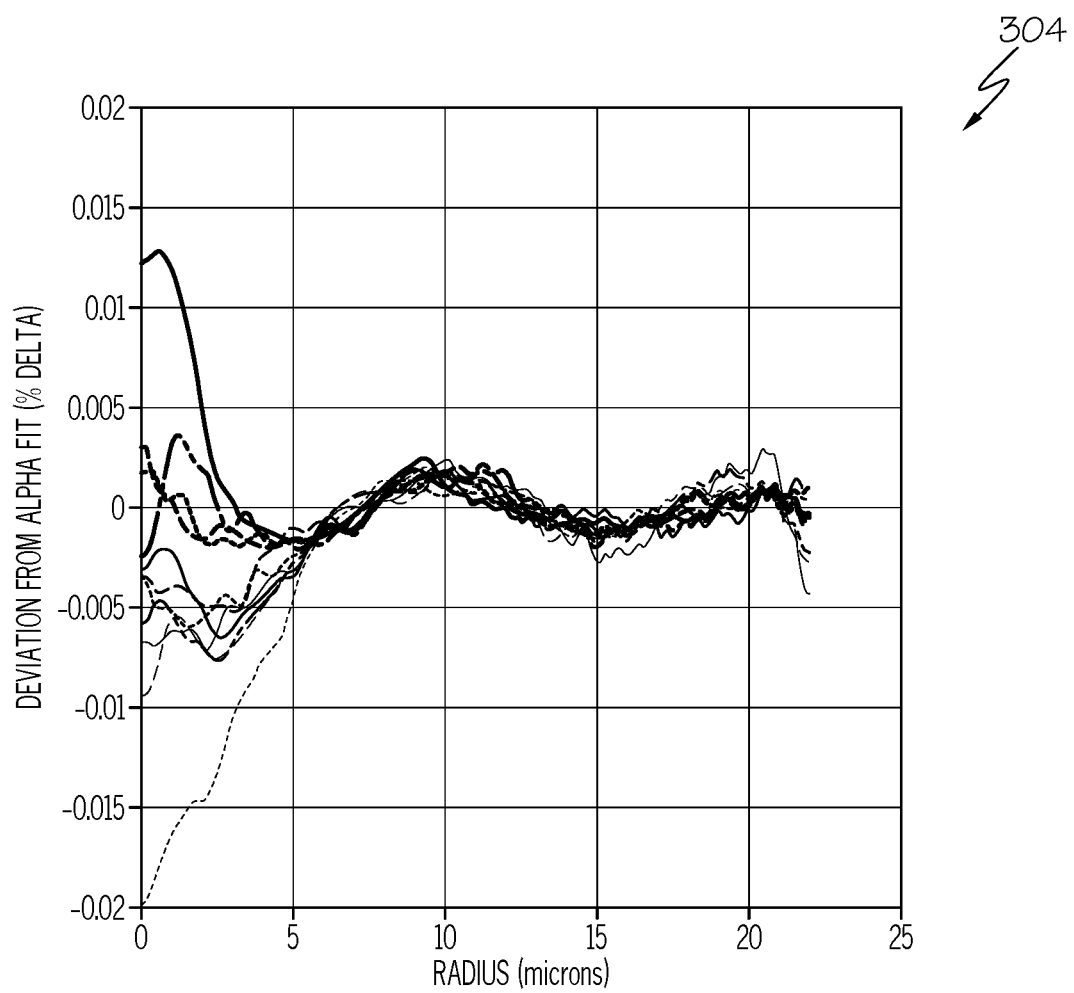
FIG. 3C depicts a plot of a plurality of non-alpha residual profiles $\Delta_{diff}(r)$ for optical fiber, representing deviations from alpha profiles as a function of radial position, according to one or more embodiments described herein.

FIG. 3C depicts a plot 304 depicting a plurality of non-alpha residual profiles (also described herein as "non-alpha residual profiles," expressed mathematically as $\Delta_{diff}(r)=\Delta(r)-\Delta_{fit}(r)$ for several different multimode fibers made from one or more core canes. In this case, $\Delta(r)$ is the measured relative refractive index of the optical fiber, not of a multimode core cane. As shown, the plot 304 includes a plurality of non-alpha residual profiles, with each of the non-alpha residual profiles having a variety of characteristics. For example, certain non-alpha residual profiles are negative proximate to the centerline of the fiber, while others are positive. Certain non-alpha residual profiles also possess a waviness that is absent in other non-alpha residual profiles. Applicant has discovered that the magnitude of this waviness is correlated with the non-conformance of the MMF from the MMF standards that require high modal bandwidth. Through investigation, it has been discovered that this undesirable waviness in the optical fibers is related to the corresponding non-alpha residual profiles of the core canes from which the fibers were produced.

Figure 4A:
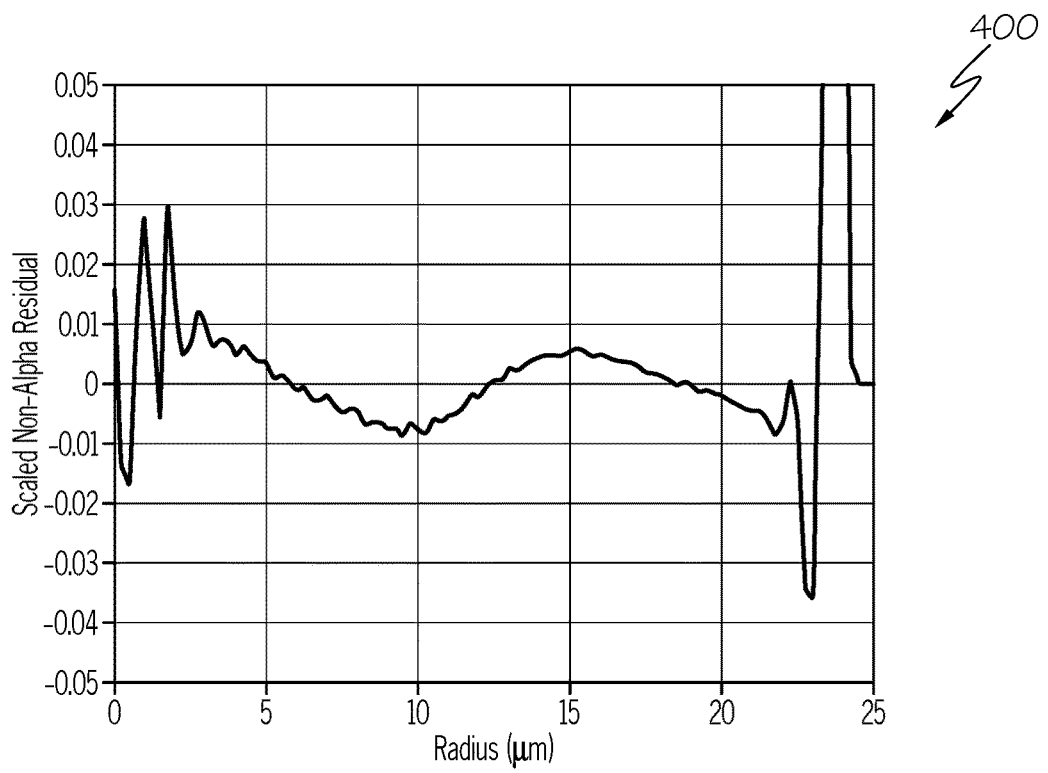
FIG. 4A depicts a plot of an average non-alpha residual profile $\Delta_{diff}(r)$ for a plurality of core canes that were successfully drawn into OM4 standard compliant multimode fibers (MMFs), according to one or more embodiments described herein.
Figure 4B:
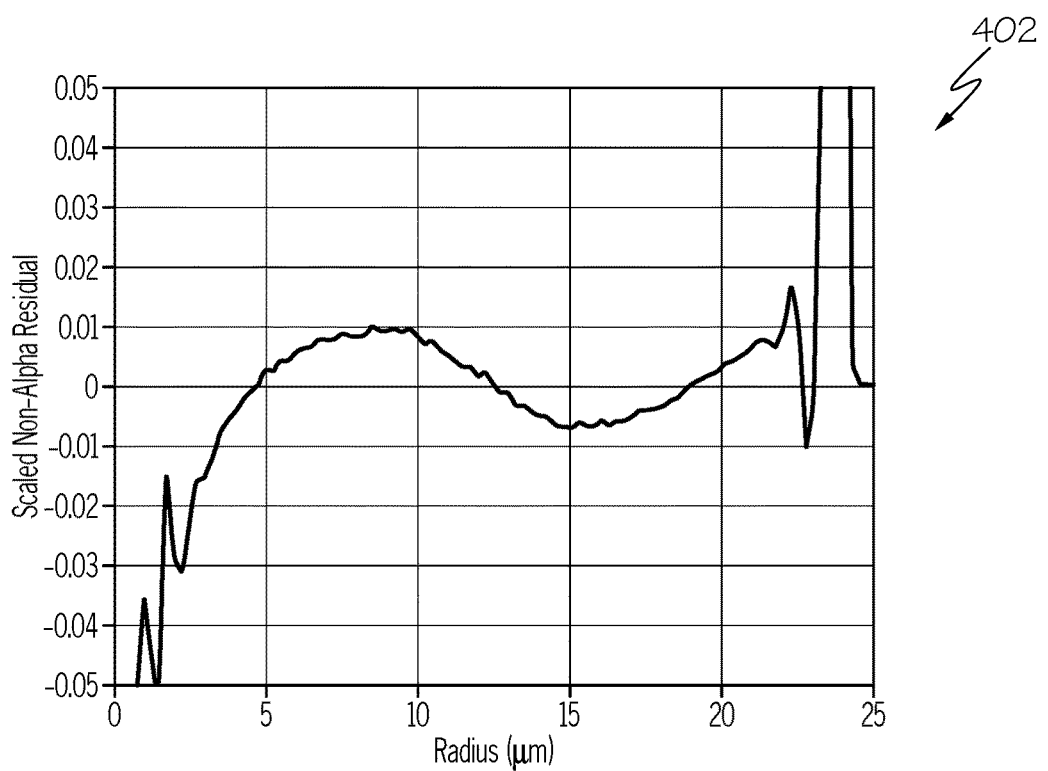
FIG. 4B depicts a plot of an average non-alpha residual profile $\Delta_{diff}(r)$ for a plurality of core canes that were not successfully drawn into OM4 standard compliant MMFs, according to one or more embodiments described herein.

To identify metrics that may be computed from a non-alpha residual profile associated with a core cane, a plurality of non-alpha residual profiles were measured for a plurality of core canes, each of which was processed into a plurality of MMFs to provide a distribution of MMFs associated with the core cane. DMD measurements were then taken to calculate the minEMBc values for each of the MMFs and to determine whether the MMFs drawn from each of the core canes met the OM4 standard. FIG. 4A depicts a plot 400 of an average non-alpha residual profile for core canes resulting in a 100% yield of MMF meeting the OM4 standard. FIG. 4B depicts a plot 402 of an average non-alpha residual profile for core canes resulting in a 0% yield of MMF meeting the OM4 standard. The values in each of the average non-alpha residual profiles depicted in FIGS. 4A and 4B were multiplied by a scaling constant to generate the plots 400 and 402 for the purposes of visualization. The plots 400 and 402 reveal distinctive features that distinguish non-alpha residual profiles of core canes resulting in a high yield of MMFs from non-alpha residual profiles of core canes resulting in a low yield of MMFs. As depicted in FIG. 4A, the average non-alpha residual profile associated with the high yield of conforming core canes is positive at the longitudinal centerline of the core cane and possesses a waviness near the centerline such that the non-alpha residual profile deviates between positive and negative values. The average non-alpha residual profile depicted in FIG. 4B, in contrast, includes a different behavior (e.g., more negative in magnitude, less wavy) proximate to the longitudinal centerline. Averaging together data from multiple core canes unexpectedly revealed a distinctive signature associated with core canes yielding high quality MMFs. Core canes yielding lower bandwidth MMFs also tended to have a distinctive signature. The metrics described herein may quantify aspects of each of these signatures and be used to classify core canes prior to processing the core canes into MMFs. A similar method of analysis can be used for MMF standards other than the OM4 standard.

Figure 5A:
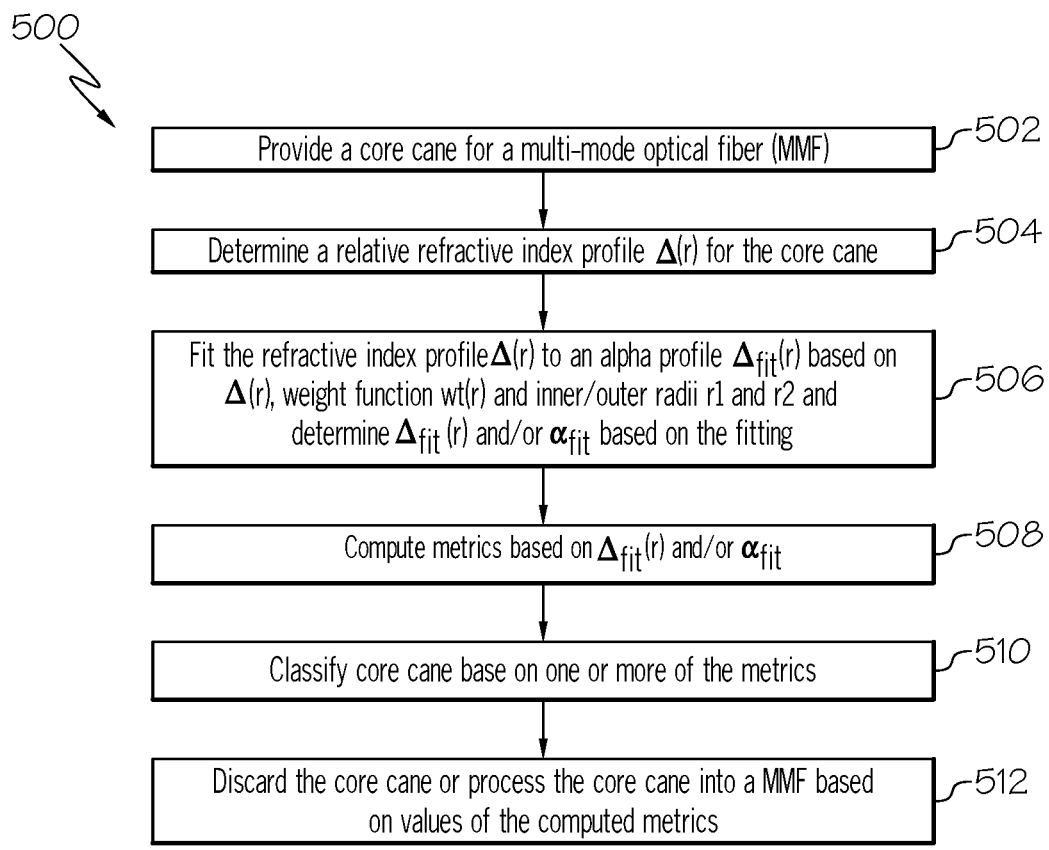
FIG. 5A depicts a flow diagram of a method of classifying a core cane based on one or more metrics, according to one or more embodiments described herein.
Figure 5B:
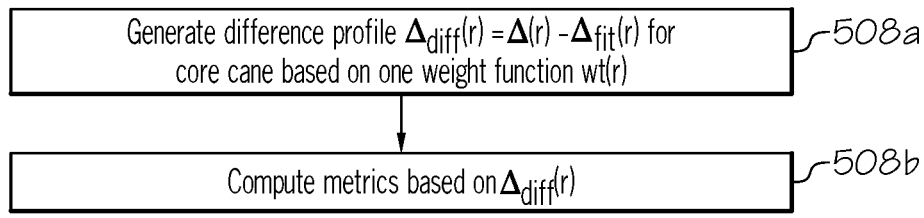
FIG. 5B depicts a flow diagram for computing metrics of a core cane based on a non-alpha residual profile $\Delta_{diff}(r)$ associated therewith, according to one or more embodiments described herein.
Figure 5C:
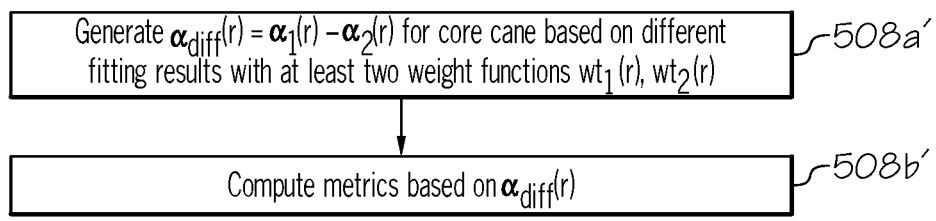
FIG. 5C depicts a flow diagram for computing metrics of a core cane based on a an a difference metric $\alpha_{diff}(r)$ associated therewith, according to one or more embodiments described herein.

FIGS. 5A-5C, depict a flow diagram of a method 500 of classifying a core cane based on one or more metrics computed from a non-alpha residual profile thereof. The method 500 may be performed to select a multimode core cane for further processing (e.g., overcladding, drawing, measurement, etc.) based on metrics associated with a non-alpha residual profile thereof. The method 500 may lower production costs associated with producing MMFs by being able to identify core canes unlikely to yield a MMF meeting a MMF standard. The method 500 may also be performed to rank core canes into a plurality of classification bins with different sets of numerical ranges associated with the metrics described herein. By setting aside low quality core canes, the method 500 may save time and resources by preventing further processing of core canes that have little chance to result in a MMF conforming with a desired MMF standard.

At block 502, a core cane for a MMF is provided. In embodiments, the core cane may be fabricated via outside vapor deposition or other suitable techniques. For example, a silica soot body may be formed by reacting precursor materials to generate core glass soot that is deposited onto a target rod to form a soot body. Dopants may be incorporated into the soot body prior to or during consolidation of the soot body to produce a fiber preform having a relative refractive index profile. The fiber preform may then be heated in a draw furnace and drawn into a plurality of core canes including the core cane. It should be understood that the present disclosure is not limited to fiber preforms fabricated by outside vapor deposition. Non-alpha residual profiles may apply to fiber preforms generated by modified chemical vapor deposition (MCVD) or plasma activated chemical vapor deposition (PCVD), where the relative refractive index profile of the core canes can be measured before drawing.

At block 504, a relative refractive index profile $\Delta(r)$ is determined. The relative refractive index profile $\Delta(r)$ may be measured with a suitable scanning technique, such as the method disclosed in U.S. Pat. No. 9,989,458 B2, entitled "High Precision Measurement of Refractive Index Profile of Cylindrical Glass Bodies," filed on Oct. 30, 2015, hereby incorporated by reference in its entirety.

At block 506, the relative refractive index profile $\Delta(r)$ is fit to an alpha profile $\Delta_{fit}(r)$. A suitable least squares fitting method, such as the Nelder-Mead algorithm (Nelder, John A. and R. Mead, "A simplex method for function minimization," Computer Journal 7: 308-313 (1965)) may be used to identify values for $\Delta_{o,fit}$, $a_{fit}$, and/or $\alpha_{fit}$ that minimize the least squared error, as defined above in Equation 4. Any particular weighting scheme may be used in the least squares fitting method. In embodiments, multiple weighting schemes are used to generate a plurality of alpha profiles (e.g., corresponding $\Delta_{fit,1}(r)$ and $\Delta_{fit,2}(r)$ described herein with respect to FIGS. 3A and 3B).

At block 508 metrics of the core cane are computed based on either $\Delta_{fit}(r)$ and/or $\alpha_{fit}$. For example, in embodiments, a non-alpha residual profile $\Delta_{diff}(r)=\Delta(r)-\Delta_{fit}(r)$ is generated for the core cane as indicated in block 508a (FIG. 5B) and metrics for the core cane are computed in block 508b (FIG. 5B) based on the non-alpha residual profile $\Delta_{diff}(r)=\Delta(r)-\Delta_{fit}(r)$. The metrics that may be computed from the non-alpha residual profile are described in greater detail herein.

Alternatively or additionally, an a difference metric $\alpha_{diff}(r)=\alpha_1(r)-\alpha_2(r)$ may be generated for the core cane as indicated in block 508a' (FIG. 5C) and metrics for the core cane may be determined based on the a difference metric. The values $\alpha_1(r)$ and $\alpha_2(r)$ may be based on different values of $\alpha_{fit}$ in Equation 3 computed using the weighting functions $w_1(r)$ and $w_2(r)$, as described in greater detail herein.

As described above, with respect to FIGS. 4A and 4B, core canes tending to result in MMFs not meeting the OM4 MMF standard tended to have non-alpha residual profiles that were more negative proximate to the center of the core cane and that had a different wave structure compared to those associated with core canes producing MMFs meeting the MMF standard. Accordingly, two metrics $\Delta_{diff-sum, neg}$ and $\Delta_{diff-sum, pos}$ quantify the positivity and negativity of the difference profile proximate to the center of the core cane and may be expressed as $$\Delta_{diff-sum,neg}=\int_{r=0}^{r=x*\alpha_{fit}}\Delta_{diff,neg}(r)dr \qquad (6)$$

where x defines an analysis region (e.g., in embodiments, x is less than 0.5, such as x=0.2) and $\Delta_{diff, neg}$ is $\Delta_{diff}(r)$ multiplied by a weighting function y(r) that is 1 when $\Delta(r)$ is less than $\Delta_{fit}(r)$ and 0 when $\Delta(r)$ is greater than $\Delta_{fit}(r)$; and $$\Delta_{diff-sum,pos}=\int_{r=0}^{r=x*\alpha_{fit}}\Delta_{diff,pos}(r)dr \qquad (7)$$

$\Delta_{diff, pos}$ is $\Delta_{diff}(r)$ multiplied by a weighting function z(r) that is 1 when $\Delta(r)$ is greater than $\Delta_{fit}(r)$ and 0 when $\Delta(r)$ is less than $\Delta_{fit}(r)$.

Additional metrics that may help distinguish between high and low quality core canes provide maximum positive and negative values of the difference profile. In embodiments, such metrics include $\Delta_{diff-neg, max}$, which corresponds to a maximum magnitude that $\Delta(r)$ is exceed by $\Delta_{fit}(r)$ between r=0 and r=x*$a_{fit}$, and $\Delta_{diff-pos, max}$, which corresponds to a maximum magnitude that $\Delta(r)$ exceeds $\Delta_{fit}(r)$ between r=0 and r=x*$a_{fit}$. In embodiments, the metrics $\Delta_{diff-sum, neg}$, $\Delta_{diff-sum, pos}$, $\Delta_{diff-neg, max}$, $\Delta_{diff-pos, max}$ are computed within an analysis region proximate to a centerline of the core cane. For example, computation of the metrics $\Delta_{diff-sum, neg}$, $\Delta_{diff-sum, pos}$, $\Delta_{diff-neg, max}$, $\Delta_{diff-pos, max}$ may be performed in the innermost 20% of the core cane (e.g., until a ratio to a radial position r to $a_{fit}$ is 0.2). The metrics $\Delta_{diff-sum, neg}$, $\Delta_{diff-sum, pos}$, $\Delta_{diff-neg, max}$, $\Delta_{diff-pos, max}$ are graphically depicted and described in greater detail herein with respect to FIGS. 9A and 9B.

In embodiments, another metric that may be computed from the non-alpha residual profile is a weighted summation $\tau_{err}$ computed by:

$$\tau_{err}=\int_{r=0}^{\alpha_{fit}}g(r)*\Delta_{diff}(r)dr \qquad (8)$$

where g(r) is a predetermined weighting function. In embodiments, the weighting function g(r) is selected such that $g(r)*\Delta_{diff}(r)$ estimates a difference between two mode group delays of an optical fiber produced from the core cane. In embodiments, the weighting function g(r) is selected to maximize separation between the 100% OM4 core canes and the 0% OM4 core canes. In embodiments, the weighting function g(r) is selected such that the metric $\tau_{err}$ estimates a difference between a sixth mode group delay and a first mode group delay (e.g., $\tau_6-\tau_1$, as defined herein). It was unexpectedly discovered that core canes resulting in a slightly negative estimated $\tau_6-\tau_1$ mode group delay difference tended to produce a higher yield of MMFs conforming to the OM4 standard. The derivation of the weighting function g(r) to estimate the difference between a sixth mode group delay $\tau_6-\tau_1$ is described in greater detail herein with respect to FIGS. 6A-8.

In embodiments, the metrics computed based on the non-alpha residual profile may also include a magnitude metric $PW_{err}$ computed by:

$$PW_{err} = \frac{1000}{\Delta_{o,fit}} \frac{\int_0^{a_{fit}} \Delta_{fit}(r)*r*|\Delta_{diff}(r)|dr}{\int_0^{a_{fit}} \Delta_{fit}(r)*rdr} \qquad (9)$$

The $PW_{err}$ metric represents a total amount that the measured relative refractive index profile $\Delta(r)$ deviates from the alpha profile $\Delta_{fit}(r)$.

In embodiments, the metrics computed to characterize the core cane may also include an alpha profile difference metric $\alpha_{diff}$ computed by:

$$\alpha_{diff}=\alpha_1-\alpha_2 \qquad (10)$$

as noted herein, where $\alpha_1$ and $\alpha_2$ comprise different values of $\alpha_{fit}$ in Equation 3 computed using the weighting functions $w_1(r)$ and $w_2(r)$ described above with respect to FIGS. 3A and 3B, respectively. Thus the metrics described herein and in FIGS. 5A-5C may include two types: (1) those based on metrics using the non-alpha residual profile error $\Delta_{diff}(r)=\Delta(r)-\Delta_{fit}(r)$ and (2) those based on the difference in fitting parameters (like $\alpha_{fit}$) using different weights w(r) or inner/outer limits of the fitting region (i.e. w(r)=0 outside the fitting region).

Referring still to FIGS. 5A-5C, in embodiments, at block 510, the method 500 includes classifying the core cane based on one or more of the metrics computed from the non-alpha residual profile $\Delta_{diff}(r)$ and or the alpha profile difference metric $\alpha_{diff}$ of the core cane. In embodiments, the core cane may be classified in accordance with a classification scheme comprising a plurality of classification bins, with each classification bin including numeral ranges of values associated with each computed metric. The classification may be based on one or more of the $\Delta_{diff-sum, neg}$, $\Delta_{diff-sum, pos}$, $\Delta_{diff-neg, max}$, $\Delta_{diff-pos, max}$, $\tau_{err}$, $PW_{err}$, and $\alpha_{diff}$ metrics described herein. The numerical ranges associated with the classification bins of the classification scheme may be preselected to rank core canes based on the likelihood that a particular core cane will produce a MMF conforming to a selected MMF standard. A method of determining such numerical values will be described in greater detail herein with respect to FIG. 10.

Referring still to FIG. 5A-5C, at block 512 the core cane may be discarded or processed into a MMF based on the values of the metrics computed from the non-alpha residual profile $\Delta_{diff}(r)$ of the core cane. If the computed metrics comprise values that are similar to previously-measured core canes that produced MMFs not conforming to a MMF standard, for example, the core cane may be discarded and not processed into an MMF. The discarding of low quality core canes beneficially saves resources and time by avoiding processing core canes that are unlikely to result in a satisfactory MMF. In embodiments, if the computed metrics comprise values that indicate the core cane is of high quality (e.g., likely to produce a MMF conforming with a MMF standard), the core cane may be processed (e.g., overclad, re-drawn, coated, etc.) into a MMF.

Figure 6A:
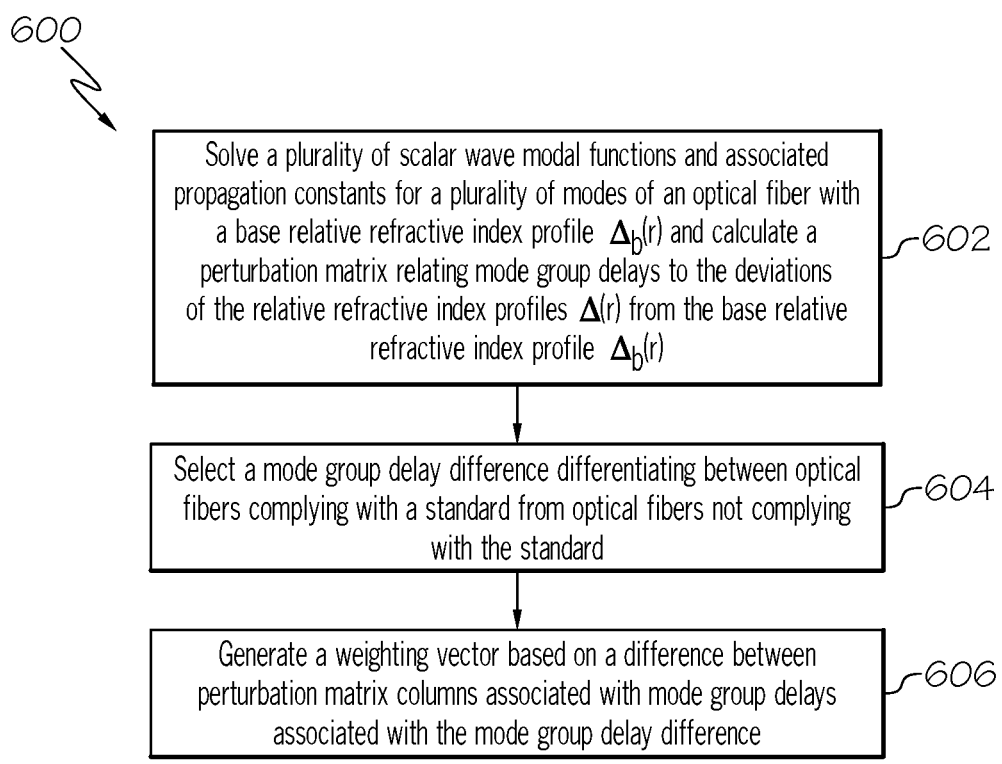
FIG. 6A depicts a flow diagram of a method of generating a weighting vector to approximate a group mode delay difference of an optical fiber using the non-alpha residual profile $\Delta_{diff}(r)$ of a core cane, according to one or more embodiments described herein.

FIG. 6A depicts a flow diagram of a method 600 of generating a weighting function for a non-alpha residual profile $\Delta_{diff}(r)$ to estimate a mode group delay difference of an optical fiber therefrom. In embodiments, the method 600 may be performed to generate the weighting function g(r) used to calculate the $\tau_{err}$ metric used to classify the core cane in the method 500 described herein with respect to FIGS. 5A-5C. At block 602, a plurality of scalar wave modal functions $\Psi_i(r)$ and associated propagation constants $\beta_i$ for a plurality of modes i of an optical fiber with a base relative refractive index profile $\Delta_b(r)$ are solved. In embodiments, the plurality of scalar wave modal functions $\Psi_i(r)$ and associated propagation constants $\beta_i$, are solved for an optical fiber with a base relative refractive index profile $\Delta_b(r)$ that corresponds exactly to the alpha profile $\Delta_{fit}(r)$ (e.g., with no deviations therefrom). Any suitable analysis may be used to solve the scalar wave functions $\Psi_i(r)$ and propagation constants $\beta_i$.

As noted for example in the book Optical Waveguide Theory by Snyder and Love (Chapman and Hall, 1983) (eqn. 33-11 p. 643), the group delay $\tau_m$ associated with a particular mode m is given by:

$$\tau_m = \frac{1}{c} * \frac{d\beta_m}{dk} \quad (11)$$

where c is the speed of light. In embodiments, the change in mode delay $\delta\tau_m$ for each individual mode for an optical fiber having a relative refractive index profile $\Delta(r)$ that deviates from the base relative refractive index profile $\Delta_b(r)$ (i.e., comprises a non-alpha residual profile $\Delta_{diff}(r)$) may be computed as:

$$\delta\tau_m = A * \frac{1}{c} \int \Delta_{diff}(r) \frac{d}{dk}(\Psi_m(r)^2 * k) r dr \quad (12)$$

where A is a scaling factor and k is the wave number ($2\pi/\lambda$), with $\lambda$ being the wavelength of light propagating through the MMF. This equation can be derived from equation 33-21 p. 645 in the book Optical Waveguide Theory by Snyder and Love (equation 33-21 gives an equation for $\delta\beta_m$ and using Equation 11 one converts it to an equation for $\delta\tau_m$). Equation 12 may be simplified for the mode groups associated with OM4 fiber to the form $$\delta = A * \frac{1}{c} \int \Delta_{diff}(r) \frac{d}{dk}(\Psi_g(r)^2 * k) r dr, \quad (13)$$

where each mode group has a pseudowave function $(\Psi_g(r))^2$ which is the sum of all the wave functions (squared) of the individual modes m in the group g (because it is normalized so the integral is 1, it is the average of the individual functions and we divide by the number of modes in the group). It is thus a weighted average of the individual scalar wave modal functions $(\Psi_m(r))^2$ of the mode group, with the radial modes being weighted at unity and the skew modes receiving a weight of 2 (because there are two individual skew modes corresponding to sine/cosine). The reason for organizing Equation 13 in "groups" is that this is what is observed in the measurement of output pulses in OM4 fiber using the differential mode delay (DMD) measurement; in addition this reduces the size of the matrix in Equation 14 below (there are about 100 individual modes but only about 16 groups).

Converting Equation 13 to discrete form, the mode group delay $\tau_m$ for an optical fiber that deviates from the base relative refractive index profile $\Delta_b(r)$ may be computed as:

$$\tau_g = C_{gr} N_r, \quad (14)$$

where $N_r$ is a vector of measured refractive indices at a plurality of radii within the optical fiber (e.g., a discrete representation of the relative refractive index profile $\Delta(r)$) and $C_{gr}$ is a perturbation matrix connecting the plurality of mode groups to index errors as a function of radial position, numerically equivalent to Equation 13. Accordingly, at block 602, the method 600 includes computing a perturbation matrix $C_{gr}$ for the plurality of mode groups of an optical fiber having a non-alpha residual profile $\Delta_{diff}(r)$.

At block 604, the method 600 includes selecting a mode group delay difference differentiating between optical fibers complying with a standard from optical fibers not complying with the standard. In embodiments, a relative refractive index profile $\Delta(r)$ is measured for a plurality of core canes to generate a plurality of vectors $N_r$ in Equation 14 for each core cane. Each of the vectors $N_r$ may be multiplied by the perturbation matrix $C_{gr}$ computed at block 602 to generate a plurality of mode group delays $\tau_g$ for each core cane. The core cane may then be processed into MMFs and DMD measurements may be taken to determine whether MMFs conform with a MMF standard (e.g., the OM4 standard). Correlations between different pairs of the group mode delays $\tau_g$ and whether the MMFs complied with the OM4 standard may then be identified.

Figure 6B:
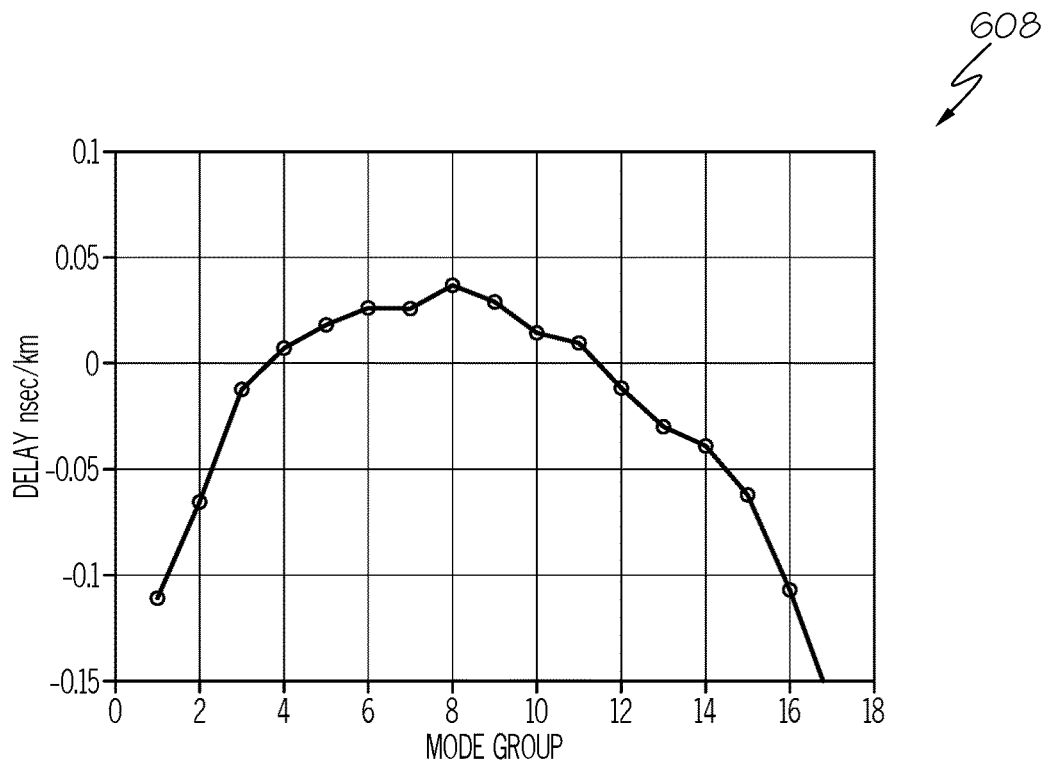
FIG. 6B depicts a plot of mode group delays for a first optical fiber not complying with the OM4 standard, according to one or more embodiments described herein.
Figure 6C:
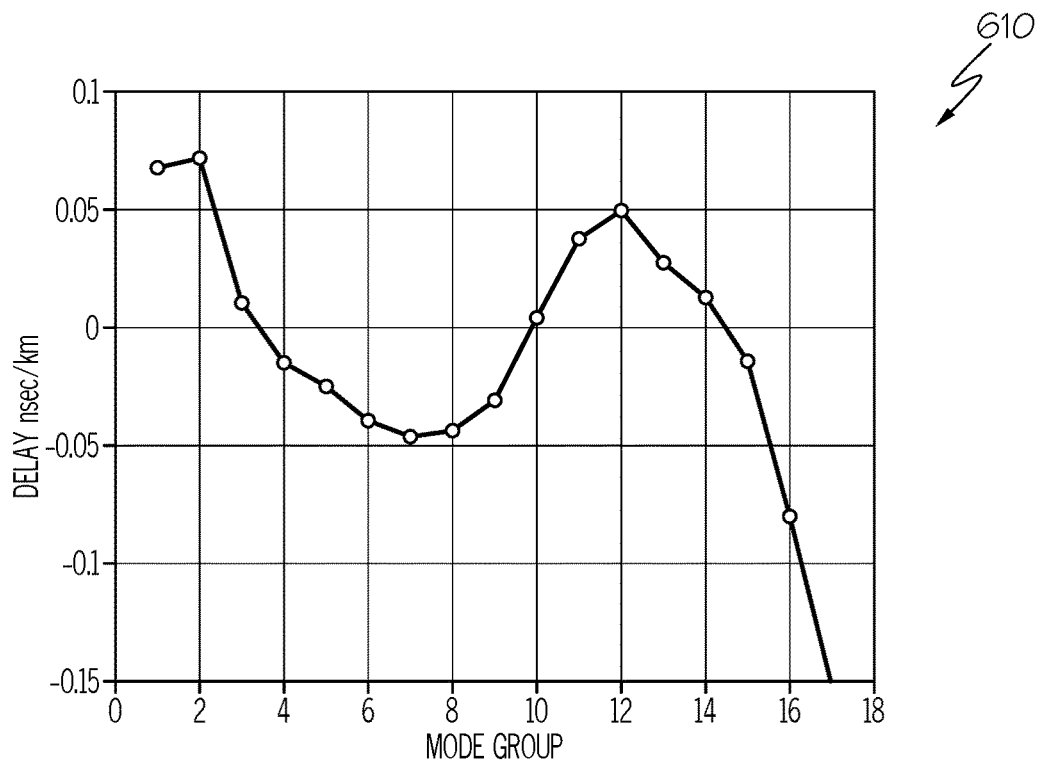
FIG. 6C depicts a plot of mode group delays for a second optical fiber complying with the OM4 standard, according to one or more embodiments described herein.

In an example, FIG. 6B depicts a plot 608 of a plurality of mode group delays $\tau_g$ at 850 nm for a low bandwidth optical fiber not meeting the OM4 standard. FIG. 6C depicts a plot 610 of a plurality of mode group delays $\tau_g$ at 850 nm for a high bandwidth optical fiber meeting the OM4 standard. The mode group delays $\tau_g$ depicted in FIGS. 6B and 6C are relative to the same reference delay for purposes of visualization. A plurality of similar plots were generated for a plurality of different core canes that were subsequently processed into MMFs. It was determined that core canes resulting in MMFs complying with the MMF standard had similar mode group delay profiles to one another and that core canes resulting in MMFs not complying with the MMF standard had similar mode group delay profiles to one another. The plot 608 depicted in FIG. 6B, for example, shows that the mode group delays $\tau_g$ at 850 nm increase between mode groups 1 to 8 and then decrease. The plot 610 of FIG. 6C has a shape that differs from that of the plot 608 in that the mode group delays at 850 nm decrease between mode groups 2 and 6. In studying similar results for a plurality of core canes, it was determined that a difference between $\tau_6$ and $\tau_1$ (i.e., $\tau_6-\tau_1$) was best statistically at distinguishing core canes that successfully formed OM4 fibers from those that that did not. As depicted in FIG. 6C, the value of $\tau_6-\tau_1$ for the core cane that produced an OM4 fiber is a negative value, whereas the value of $\tau_6-\tau_1$ for the core cane that was not successful in producing an OM4 fiber has a positive value (FIG. 6B). In a study of a plurality of core canes, it was found that this result tended to hold true for a plurality of core canes. Details of this analysis are described in greater detail with respect to FIG. 7. While $\tau_6-\tau_1$ was selected in this example, it should be understood that other mode group delay differences may be used in accordance with the present disclosure. Different mathematical combinations (e.g., other than differences) of mode group delays may also be used to generate weighting functions used to classify core canes. For example, the following three metrics can be constructed from the set of group delays $\tau_g$ constructed in Equation 14. Example Metric 1 is the $\tau_6-\tau_1$ metric just explained in detail.

$$\tau_{METRIC\ 1} = \tau_6 - \tau_6 = C_{1,r} N_r - C_{2,r} N_r \quad (15a)$$

Example Metric 2 is the RMS width of a pulse formed by the mode delays each with a specified weight $P_g$ (the mode power distribution MPD). For example, a so-called "overfilled launch distribution" corresponds to each of the m individual modes having the same power, so that the relative power in group is proportional to g. The MPD $P_g$ is normalized so the sum is 1.

$$\tau_{METRIC\ 2} = \sqrt{\Sigma_g P_g (\tau_g - \tau_{ave})^2}; \tau_{ave} = \Sigma_g P_g \tau_g \quad (15b)$$

Example Metric 3 is the so-called 3 dB bandwidth $f_{3dB}$ of the fiber, which can be calculated from the estimated $\tau_g$ and the assumed MPD $P_g$ using formulas explained in Chapter 7 of the book Optical Fiber Telecommunications VIA (Elsevier, 2013, pp. 243-282, equations 7.5 and 7.6). The 3 dB bandwidth $f_{3dB}$ is the frequency f where the amplitude of the impulse response |H(f)| reaches 0.5, where |H(f)| is given by:

$$|H(f)| = \sqrt{\left(\sum_g P_g \cos(2\pi f \Delta \tau_g)\right)^2 + \left(\sum_g P_g \sin(2\pi f \Delta \tau_g)\right)^2}; \quad (15c)$$

$$\Delta \tau_g = \tau_g - \tau_{ave}$$

With reference to FIG. 6A, at block 606, the method 600 comprises generating a weighting vector g(r) based on a difference between columns of the perturbation matrix $C_{gr}$ associated with the mode group delays of the mode group delay difference selected at block 604. That is, in the preceding example described with respect to FIGS. 6B and 6C, the perturbation matrix column $C_{1,r}$ may be subtracted from the perturbation matrix column $C_{6,r}$ to generate the weighting function to be multiplied by the non-alpha residual profile $\Delta_{diff}(r)$ to estimate a mode group delay difference based on the relative refractive index profile $\Delta(r)$ of a core cane.

Figure 7:
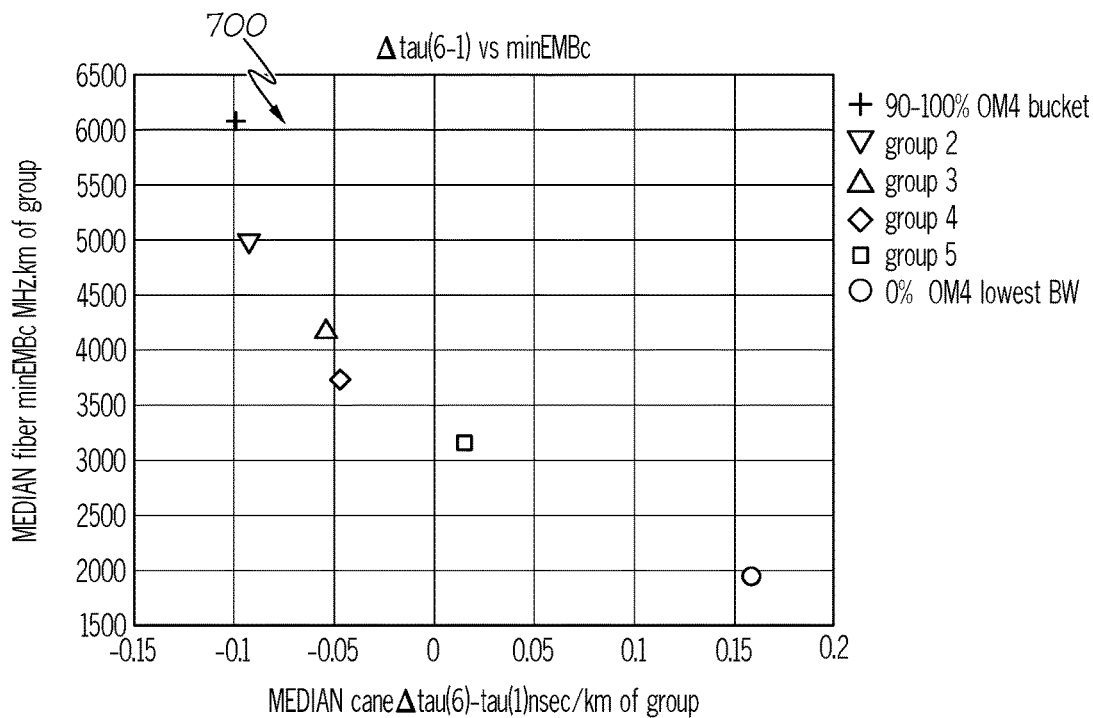
FIG. 7 depicts a plot of bandwidth for a plurality of MMFs as a function of a $\tau_{err}$ metric computed from non-alpha residual profiles associated with a plurality of core canes, according to one or more embodiments described herein.

FIG. 7 depicts a plot 700 of measured bandwidth (minEMBc values) at 850 nm for a plurality of optical fibers as a function of the previously described $\tau_6-\tau_1$ metric computed from a plurality of non-alpha residual profiles $\Delta_{diff}(r)$ of a plurality of core canes that were processed into the plurality of optical fibers from which the minEMBc values were determined. The underlying data differentiated the fibers and canes into groups based on compliance with the OM4 standard. Each symbol plots y=median fiber EMBc of the group versus x=median $\tau_6-\tau_1$ metric of the group. As shown, a high bandwidth group—denoted by the "+" sign in FIG. 7—was associated with 90-100% OM4 compliance, while a low bandwidth group—denoted by the "o" sign in FIG. 7—was associated with 0% OM4 compliance. Intermediate groups—between the first and second groups—had intermediate levels (i.e., between 0% and 90%) of OM4 compliance. As depicted in FIG. 7, the minEMBc value at 850 nm trends negatively as a function of the $\tau_6-\tau_1$ metric. The high bandwidth group surprisingly clustered at a negative value for the $\tau_6-\tau_1$ metric, while other, lower bandwidth groupings of optical fibers clustered at positive values for the $\tau_6-\tau_1$ metric. In accordance with this example, the $\tau_6-\tau_1$ metric may be selected as a mode group delay difference distinguishing core canes resulting in MMFs that comply and do not comply with the OM4 standard at block 604 of the method 600 described herein with respect to FIG. 6.

In embodiments, a similar mode of analysis may be used to identify ranges associated with any of the metrics computed from a non-alpha residual profile $\Delta_{diff}(r)$ described herein (e.g., $\Delta_{diff-sum,\ neg}$, $\Delta_{diff-sum,\ pos}$, $\Delta_{diff-neg,\ max}$, $\Delta_{diff-pos,\ max}$, $\tau_{err}$, $PW_{err}$, and $\alpha_{diff}$). That is, such metrics may be measured for a plurality of core canes, which are subsequently processed into a plurality of MMFs. DMD measurements may be performed on the MMFs and plots for each of the metrics similar to the plot 700 may be generated. These plots may be used to identify ranges associated with each of the metrics that are associated with higher quality and lower quality core canes.

Figure 8:
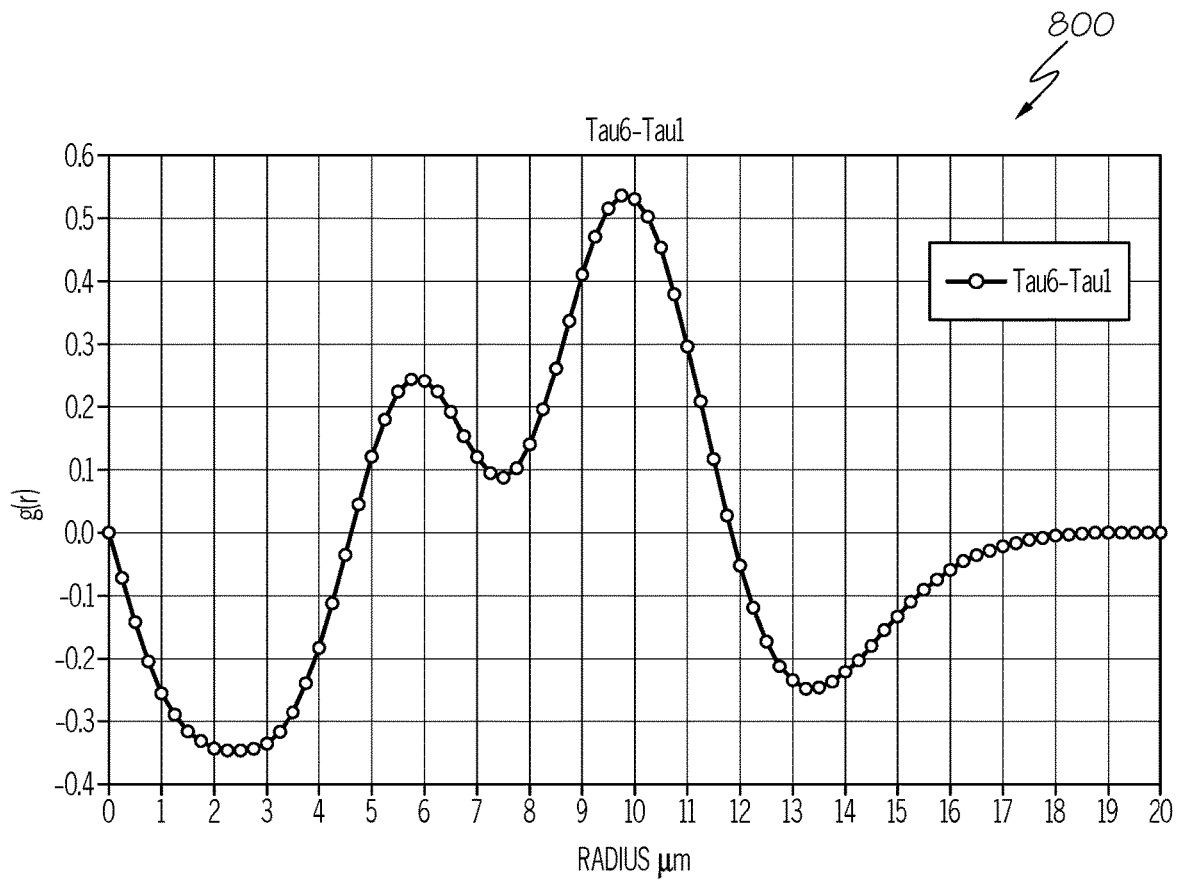
FIG. 8 depicts a plot of a weighting function determined from the weighting vector generated via the method of FIG. 6A, according to one or more embodiments described herein.

FIG. 8 depicts a plot 800 of an example weighting function g(r) used to compute the $\tau_{err}$ metric (e.g., the $\tau_6-\tau_1$ metric) described herein. The weighting function g(r) may have been computed via performance of the method 600 described herein with respect to FIG. 6A. As shown, in this example, there is a negative weight from 0 to 4.5 μm, a positive weight from 4.5 to 12 μm, and a negative weight from 12 μm to 20 μm.

Figure 9A:
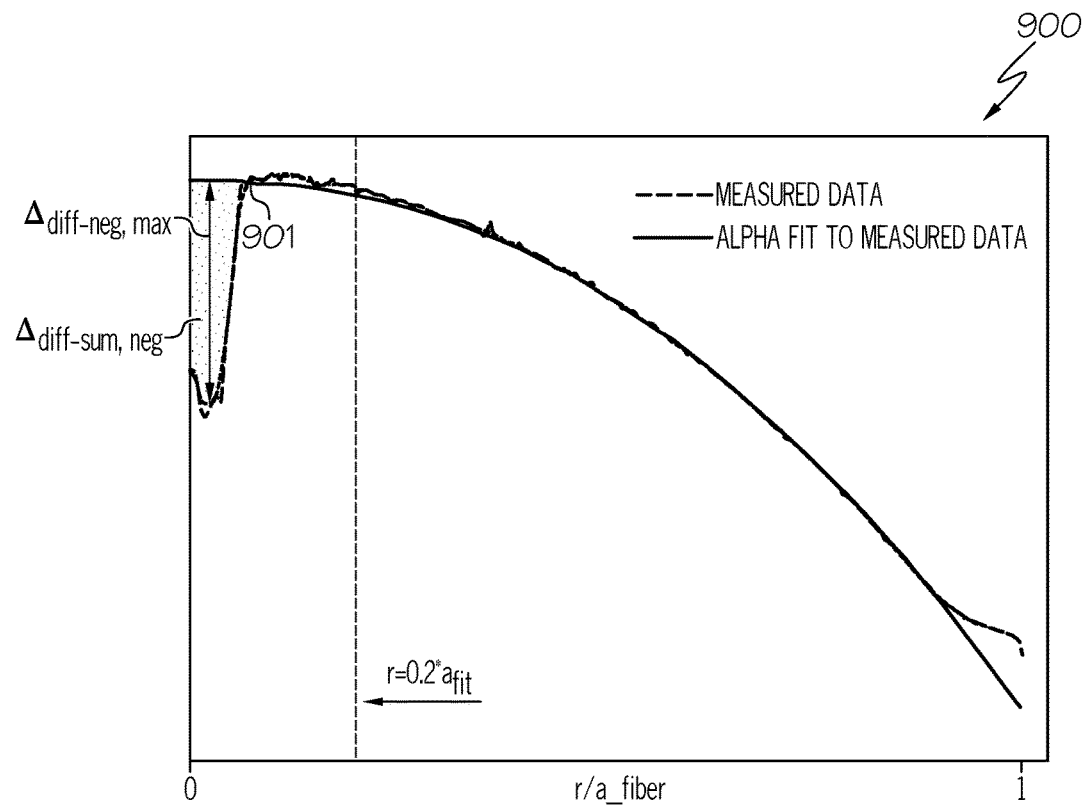
FIG. 9A depicts a plot of a first relative refractive index profile, first alpha fit, and metrics computed based on the first relative refractive index profile and first alpha fit, according to one or more embodiments described herein.
Figure 9B:
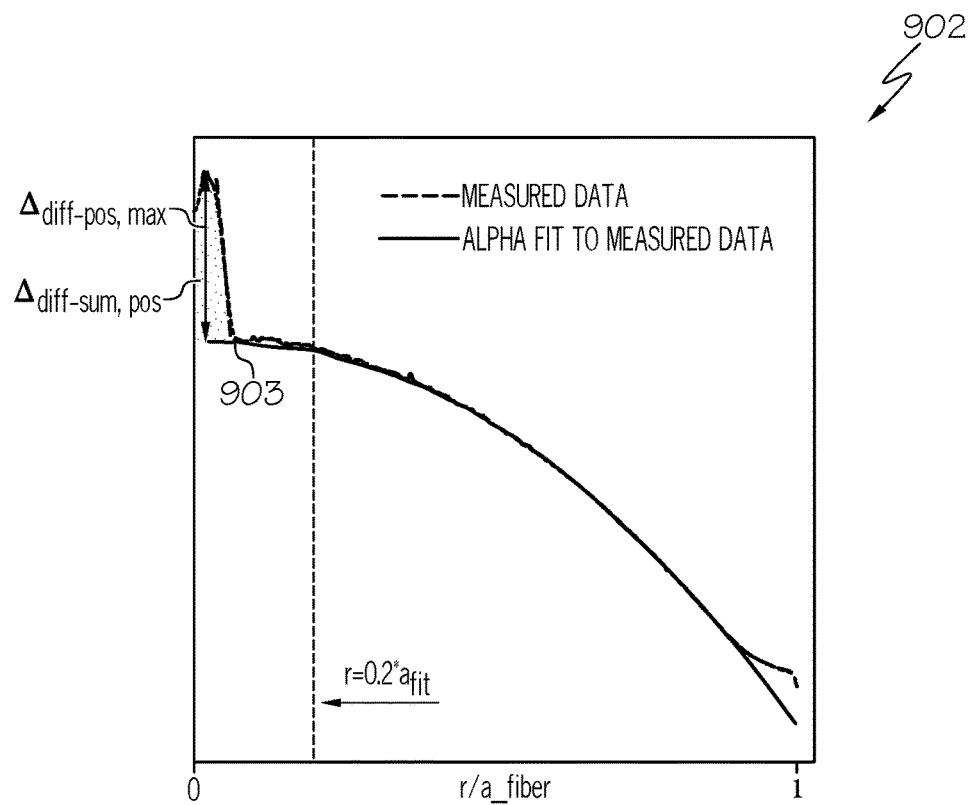
FIG. 9B depicts a plot of a second relative refractive index profile, second alpha fit, and metrics computed based on the second relative refractive index profile and second alpha fit, according to one or more embodiments described herein.

FIGS. 9A and 9B depict plots 900 and 902 of relative refractive index profiles and alpha fits for two different core canes (e.g., two different relative refractive index profiles $\Delta(r)$ and two different alpha profiles $\Delta_{fit}(r)$ described herein). As depicted, each of the relative refractive index profiles deviates from the alpha fit proximate to the longitudinal centerline of the core cane. In the plot 900, the non-alpha residual profile is negative proximate to the longitudinal centerline (indicating that $\Delta_{fit}(r)$ is greater than $\Delta(r)$). As shown, in such cases, the metric $\Delta_{diff-sum,\ neg}$ is the area between the alpha fit $\Delta_{fit}(r)$ and the relative refractive index profile $\Delta(r)$ from the longitudinal centerline to the nearest radial point 901 where the relative refractive index profile $\Delta(r)$ crosses the alpha fit $\Delta_{fit}(r)$ (i.e., representing a point where the difference profile $\Delta_{diff}(r)$ is 0). The metric $\Delta_{diff-neg,\ max}$ is a maximum negative deviation of the relative refractive index profile $\Delta(r)$ from the alpha fit $\Delta_{fit}(r)$ within an analysis region between the longitudinal centerline and a radial position that is 20% of an outer radius (e.g., corresponding to the value $\Delta_{fit}$ of the alpha fit $\Delta_{fit}(r)$) of the core cane.

In the plot 902, the non-alpha residual profile is positive proximate to the longitudinal centerline of the core cane (indicating that $\Delta(r)$ is greater than $\Delta_{fit}(r)$). As shown, in such cases, the metric $\Delta_{diff-sum,\ pos}$ is the area between the alpha fit $\Delta_{fit}(r)$ and the relative refractive index profile $\Delta(r)$ from the longitudinal centerline to the nearest radial point 903 where the relative refractive index profile $\Delta(r)$ crosses the alpha fit $\Delta_{fit}(r)$ (i.e., representing a point where the difference profile $\Delta_{diff}(r)$ is 0). The metric $\Delta_{diff-pos,\ max}$ is a maximum positive deviation of the relative refractive index profile $\Delta(r)$ from the alpha fit $\Delta_{fit}(r)$ within an analysis region between the longitudinal centerline and a radial position that is 20% of an outer radius (e.g., corresponding to the value $a_{fit}$ of the alpha fit $\Delta_{fit}(r)$) of the core cane. It should be appreciated that, in embodiments, the analysis region may be a different proportion of the outer radius (e.g., greater than or equal to 5% and less than or equal to 50%, greater than or equal to 10% and less than or equal to 40%, greater than or equal to 15% and less than or equal to 30% of the outer radius) of the core cane. However, it has been found that typical limiting sources of the OM4 standard bandwidth metric minEMBc are located within the inner half (e.g., corresponding to a region extending radially outward from the longitudinal centerline to half the outer radius of the core cane).

While the preceding example pertained to measurement of mode group delays at 850 nm, it is anticipated that the method 600 may be used in a process of classifying core canes at other suitable wavelengths (e.g., 953 nm, 980 nm, 1060 nm, 1310 nm). In embodiments, the perturbation matrix $C_{mr}$ in Equation 14 may be used to estimate mode group delays at wavelengths other than 850 nm, where there are different numbers of mode groups for the same optical fiber. A matrix Cmr computed at 850 nm may be used to compute the $\tau_{err}$ metric at other wavelengths (e.g., 953 nm), though re-computation of the matrix Cmr (e.g., via performance of the method of FIG. 6) when computing the $\tau_{err}$ metric at wavelengths other than the wavelength at which the matrix $C_{mr}$ is computed may be beneficially, especially for relatively large wavelength shifts (e.g., of 200 nm or more). In embodiments, the method 600 may be performed for a specific wavelength or wavelength range of interest (e.g., 850-953 nm, 980 nm, 1060 nm, 990-1090 nm, 1270-1330 nm).

Figure 10:
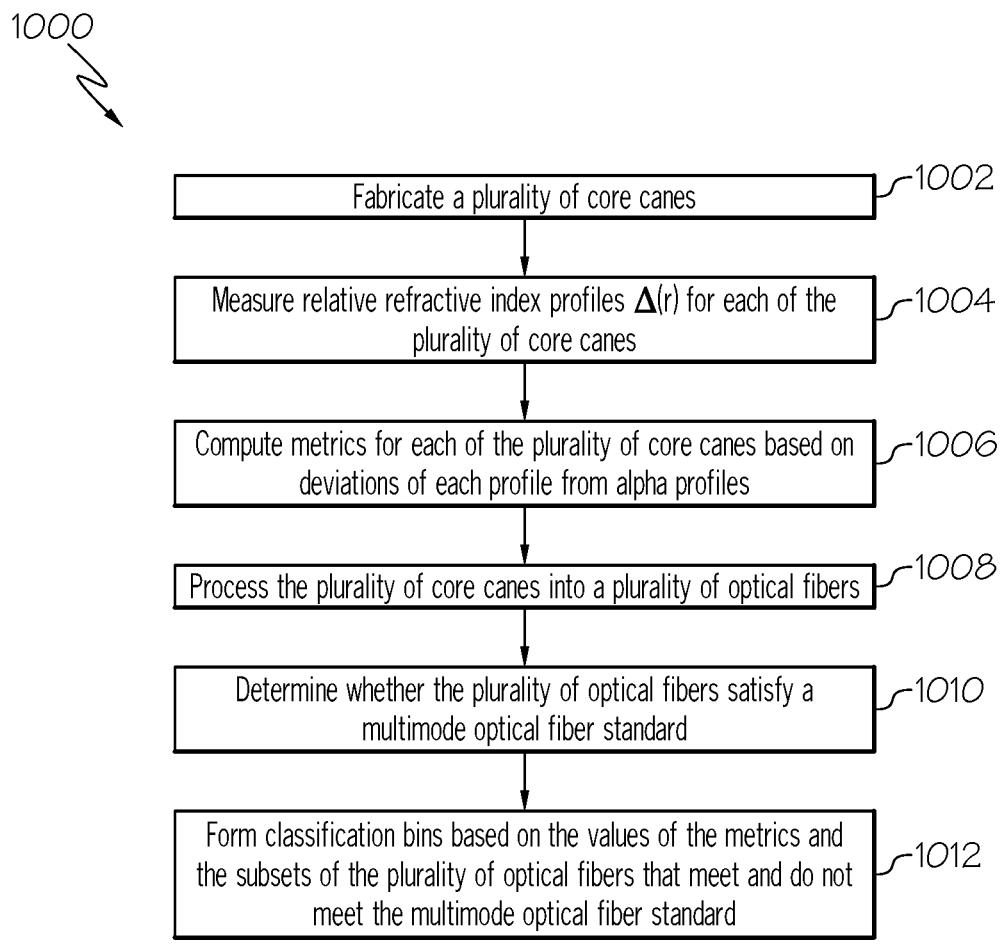
FIG. 10 depicts a flow diagram of a method of generating a classification scheme based on numerical ranges of metrics computed from non-alpha residual profiles $\Delta_{diff}(r)$ of a plurality of core canes, according to one or more embodiments described herein.

Referring now to FIG. 10, a flow diagram of a method 1000 of forming a classification scheme based on values of one or more metrics computed from non-alpha residual profiles associated with a plurality of core canes is depicted. The method 1000 may be performed to compute a plurality of numerical ranges of any combination of the metrics $\Delta_{diff-sum, neg}$, $\Delta_{diff-sum, pos}$, $\Delta_{diff-neg, max}$, $\Delta_{diff-pos, max}$, $\tau_{err}$, $PW_{err}$, and $\alpha_{diff}$ described herein that may be used to classify core canes prior to the core canes being processed into MMFs.

At block 1002, a plurality of core canes are fabricated. In embodiments, any suitable fabrication method may be used to form the plurality of core canes. For example, in embodiments, an OVD method is deployed where soot bodies are formed on target rods by reacting a silica precursor (e.g. by flame combustion or flame hydrolysis) in proximity to the target rods. The soot bodies may be subsequently up-doped with a suitable up-dopant to generate a graded relative refractive index profile that approximates an alpha profile and consolidated to form a core blank. The core blank may then be drawn to form a plurality of core canes. Such a process may be repeated a number of times to fabricate a plurality of core canes from a plurality of different core blanks. In embodiments, other suitable methods (e.g., MCVD or PCVD) may be employed to form the core canes.

At block 1004, relative refractive index profiles $\Delta(r)$ are measured for each of the plurality of core canes fabricated at block 1002. Any suitable method may be used to measure the relative refractive index profiles $\Delta(r)$ as described above. At block 1006, metrics are computed for each of the plurality of core canes based on deviations of each relative refractive index profile $\Delta(r)$ from alpha profiles $\Delta_{fit}(r)$. The metrics may be computed via performance of a process similar to that described herein with respect to the method 500 described with respect to FIGS. 5A-5C. Any combination of the metrics $\Delta_{diff-sum, neg}$, $\Delta_{diff-sum, pos}$, $\Delta_{diff-neg, max}$, $\Delta_{diff-pos, max}$, $\tau_{err}$, $PW_{err}$, and $\alpha_{diff}$ described herein may be computed for the plurality of core canes.

At block 1008 the plurality of core canes may be processed into a plurality of optical fibers. For example, in embodiments, a cladding or an overcladding layer is deposited on the core canes (e.g., via flame deposition, chemical vapour deposition, a rod-in-tube method, or other suitable deposition technique) to form fiber preforms, which are subsequently transferred to a draw furnace and drawn into optical fibers. An embodiment of a draw furnace that may be used to form the plurality of optical fibers is described in greater detail herein with respect to FIG. 12. At block 1010, it is determined whether the plurality of optical fibers fabricated at the block 1010 satisfy a MMF standard (e.g., the OM4 standard). DMD measurements may be performed to determine whether the optical fibers possess the requisite bandwidth at 850 nm, for example, to determine whether the plurality of optical fibers satisfy the OM4 standard.

Figure 11:
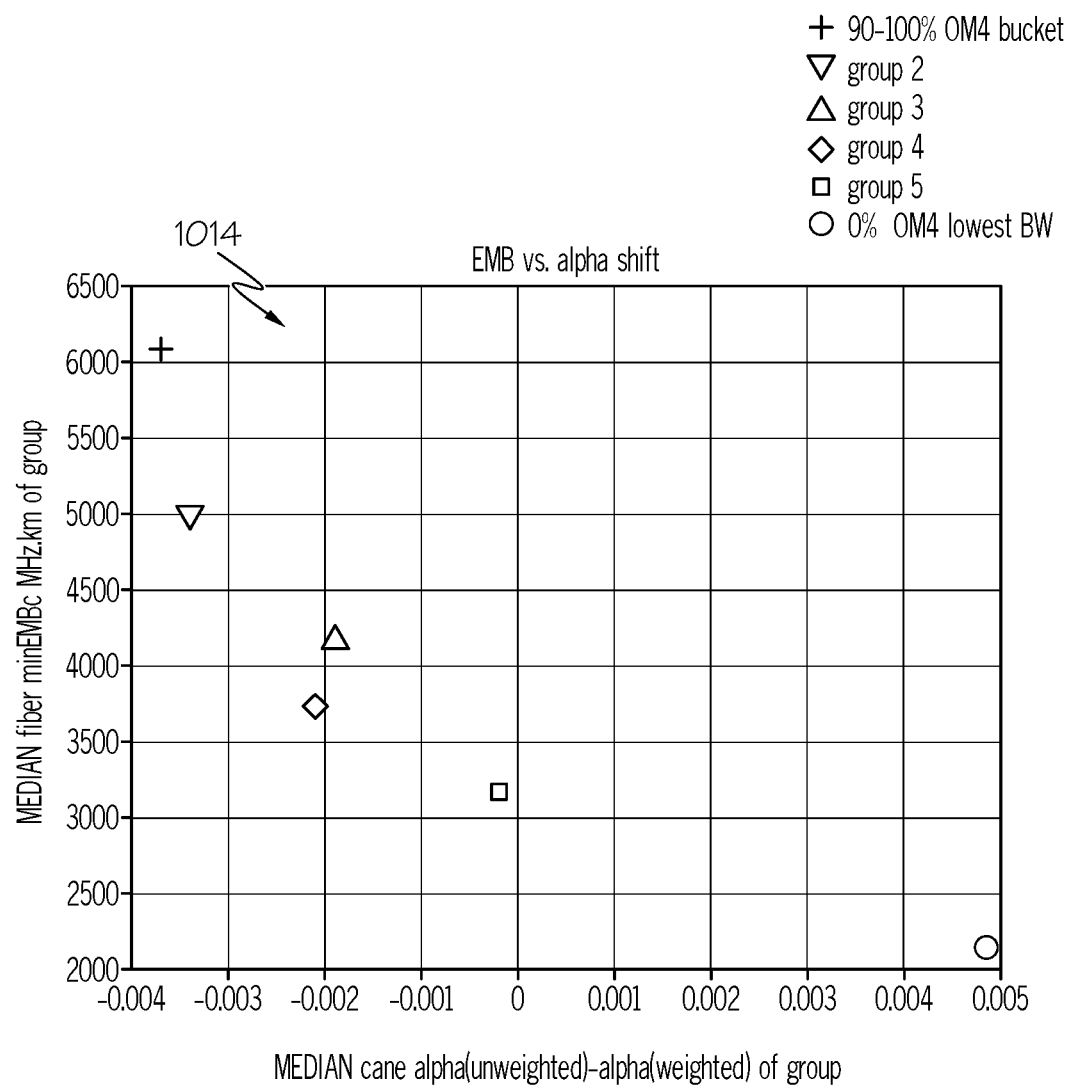
FIG. 11 depicts a plot of bandwidth for a plurality of MMFs as a function of an $\alpha_{diff}$ metric, according to one or more embodiments described herein.

At block 1012, a plurality of classification bins are formed based on the values of the metrics computed at block 1006 and the plurality of optical fibers were determined to meet the MMF standard or not meet the MMF standard at block 1010. Each of the classification bins may comprise a different set of numerical ranges associated with each of the metrics computed at block 1006. The numerical ranges may be determined by generating plots similar to the plot 700 described herein with respect to FIG. 7 for each of the computed metrics. For example, FIG. 11 depicts a plot 1014 of bandwidth values (minEMBc values) for a plurality of optical fibers as a function of the $\alpha_{diff}$ metric described herein. Similar to FIG. 7, the fibers and canes have been grouped by the % conformance with the OM4 standard, and what is plotted is the median minEMBc in MHz.km of the group versus the median (unweighted alpha—weighted alpha) difference. A high bandwidth group—denoted by the "+" sign in FIG. 11—was associated with 90-100% OM4 compliance, while a low bandwidth group—denoted by the "o" sign in FIG. 11—was associated with 0% OM4 compliance. Intermediate groups—between the first and second groups—had intermediate levels (i.e., between 0% and 90%) of OM4 compliance. As shown, for a high bandwidth group of optical fibers (associated with a high yield of 90-100% conformance with the OM4 standard), the median $p\alpha_{diff}$ metric tended to be negative and less than −0.003. On the other hand, the lowest bandwidth group (0% OM4 yield) has a median $\alpha_{diff}$ metric of almost +0.005. Classification bins can be devised based on the median $\alpha_{diff}$ metric. A highly rated classification bin may include a numerical range of the $\alpha_{diff}$ metric of greater than or equal to −0.020 and less than or equal to −0.003, and a low rated classification bin may include a numerical range of the $\alpha_{diff}$ metric of greater than +0.001. Two groups with different median bandwidths have about the same median $\alpha_{diff}$ metric, suggesting the metric in FIG. 7 may be preferable, but also suggesting an advantage of using multiple metrics combined. In practice the exact boundaries of the classification bins are chosen to both minimize the risk of incorrectly assigning a "failing" cane as passing and to minimize the risk of incorrectly assigning a "passing" cane as failing. To minimize the risk, multiple metrics can be used, and all the available data (not just the medians of the groups) can be used.

A similar procedure may be followed for any of the other metrics described herein. The numerical ranges associated with highly rated fibers may be grouped together to form a highly rated classification bin comprising numerical ranges associated with each of the metrics. The numerical ranges associated with low rated fibers may be grouped together to form a low rated classification bin comprising numerical ranges associated with each of the metrics. A medium classification bin, representing core canes that may result in optical fibers conforming with the MMF standard, may comprise a different set of numerical ranges than either the highly rated classification bin or a lower rated classification bin. In embodiments, the medium classification bin comprises a combination of numerical ranges from the highly rated classification bin and the low rated classification bin.

Figure 12:
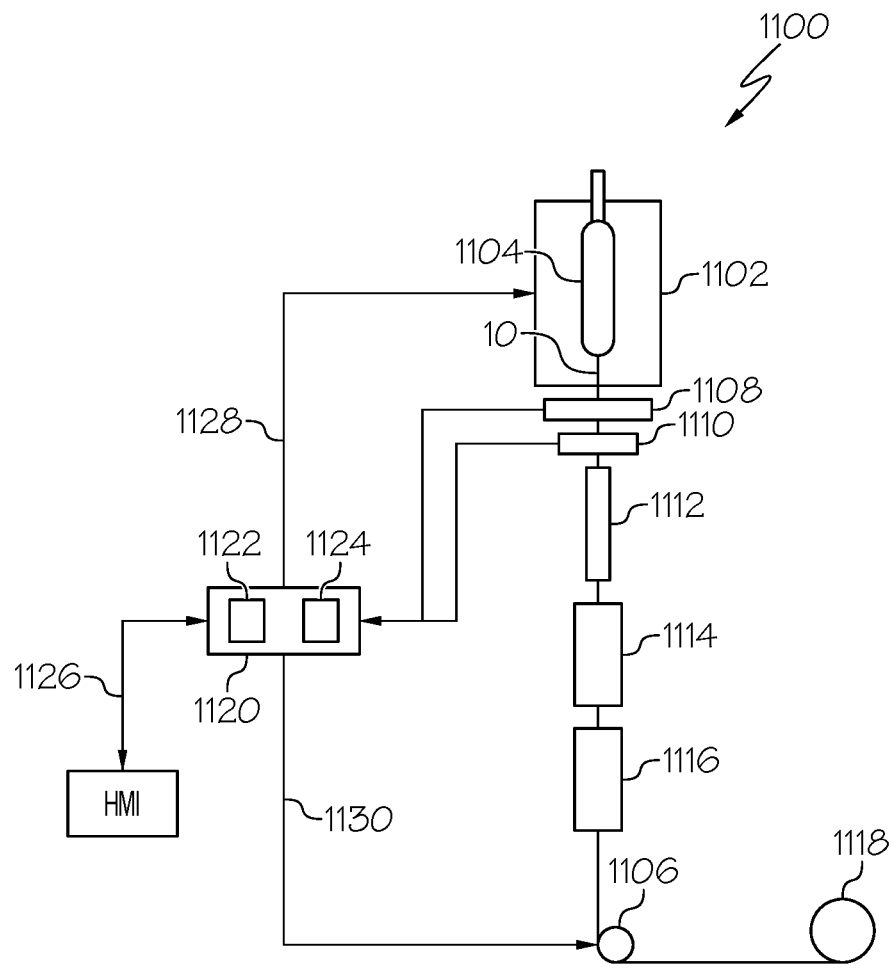
FIG. 12 schematically depicts a draw production system, according to one or more embodiments described herein.

Referring now to FIG. 12, a draw production system 1100 is schematically depicted. The draw production system 1100 may be used to process preforms that include any of the core canes described herein into an optical fiber (e.g., such as the optical fiber 10 described herein with respect to FIGS. 1 and 2). The draw production system 1100 includes a draw furnace 1102 that is heated to an elevated temperature (e.g., greater than 1000° C., typically approximately 2000° C.). An optical fiber preform 1104 is disposed vertically in the draw furnace 1102 and the draw furnace 1102 supplies heat to the optical fiber preform 1104. In embodiments, the optical fiber preform 1104 includes a core cane and at least a portion of a cladding layer disposed thereon.

During the drawing of optical fiber, the optical fiber 10 is pulled from a bottom portion of optical fiber preform 1104 by tractor 1106. After leaving the draw furnace 1102, the optical fiber 10 encounters a diameter monitoring device 1108 that provides a signal used in a feedback control loop to regulate a speed of tractor 1106 and maintain a constant fiber diameter. The optical fiber 10 then passes through a fiber tension measurement device 1110 that measures the tension of the optical fiber 10 and provides a feedback control loop to regulate the tension of optical fiber 10 and maintain a desired draw tension setting.

Once the optical fiber 10 is drawn from optical fiber preform 1104, the optical fiber 10 is cooled in a cooling tube 1112 or other controlled cooling treatment device that may be coupled to or remote from the exit of the draw furnace 1102, after optical fiber 10 is coated by coater 1114 that can apply a polymeric-based coating material to the outside surface of the optical fiber 10. The optical fiber 10 may also pass through a coating curing apparatus 1116 that cures the polymeric coating (e.g. with ultraviolet light). The optical fiber 10 is then wound onto a spool or reel 1118. Various optical attributes of the optical fiber, including the bandwidth are typically measured off-line.

The draw production system 1100 is also shown having a tension controller 1120 that may be implemented as a computer having a microprocessor 1122 and memory 1124. It should be appreciated that any processing circuitry and memory storage medium may be employed. Tension controller 1120 receives the output of diameter monitoring device 1108 and the output of the fiber tension measurement device 1110 and may process the inputs with one or more software programs. Tension controller 1120 also provides an output 1126 such as to a display or other human machine interface (HMI), for a user to view tension values indicative of the draw tension for each fiber wound on each reel. It should be appreciated that optical fiber 10 may be drawn from an optical fiber preform at different fiber tensions to achieve different values of the a described herein and hence may result in different bandwidth characteristics for the optical fiber 10. A user selected target tension T is provided as an input to tension controller 1120 (such as through the HMI) to allow a user to select a desired target tension (set point) to achieve a desired bandwidth characteristic of the optical fiber being produced.

In embodiments, the tension controller 1120 generates a temperature control output 1128 in response to the user selected target tension that may be used to control the temperature of the draw furnace 1102. The temperature control output 1128 may adjust the temperature of the draw furnace 1102 to achieve the desired fiber draw tension, according to one embodiment. Typically, an increase in the temperature of the draw furnace 1102 will cause a decrease in the tension of the drawn fiber, whereas a decrease in the temperature of the draw furnace 1102 will cause an increase in the tension of the drawn fiber. The temperature of the furnace may be adjusted with a feedback loop until the draw tension reaches the user selected tension set point. It should be apparent that the draw furnace temperature comprises a slow feedback loop as the furnace temperature changes relatively slowly. In embodiments, the tension of the drawn fiber may be adjusted through speed control output 1130 from tension controller 1120 to tractor 1106. The rotational speed of tractor 1106 controls the linear speed of the fiber being drawn by tractor 1106. Tractor 1106 may be controlled by tension controller 1120 responsive to the user selected target tension.

In embodiments, the tension controller 1120 described herein with respect to FIG. 12 (or other controller) may perform any of the computations described herein with respect to the methods 500, 600, and 1000 of FIGS. 5, 6A, and 10. In embodiments, for example, the memory 1124 comprises one or more modules with instructions that are executable by the microprocessor 1122 to cause the microprocessor 1122 to generate a relative refractive index profile $\Delta(r)$ from a plurality of refractive index measurements associated with a core cane, fit the relative refractive index profile $\Delta(r)$ to an alpha profile $\Delta_{fit}(r)$, and generate a difference profile $\Delta_{diff}(r)$ for the core cane. The instructions may also cause the microprocessor 1122 to compute any of the metrics $\Delta_{diff-sum, neg}$, $\Delta_{diff-sum, pos}$, $\Delta_{diff-neg, max}$, $\Delta_{diff-pos, max}$, $\tau_{err}$, $PW_{err}$, and $\alpha_{diff}$ described herein in a process of classifying the core cane. The memory 1124 may also comprise modules with instructions that cause the microprocessor 1122 to compute such metrics for a plurality of core canes and generate numerical ranges for one of the metrics described herein to form classification bins based on which of the core canes produced MMFs conforming to a MMF standard.

In embodiments, the computations described herein with respect to the methods 500, 600, and 1000 of FIGS. 5, 6A, and 10 may be performed by a computing system that is separate from the draw production system 1100. For example, a computing system may compute any of the metrics $\Delta_{diff-sum, neg}$, $\Delta_{diff-sum, pos}$, $\Delta_{diff-neg, max}$, $\Delta_{diff-pos, max}$, $\tau_{err}$, $PW_{err}$, and $\alpha_{diff}$ described herein in a process of determining whether to process a particular core cane into an optical fiber via the draw production system 1100 (e.g., prior to the optical fiber preform 1104 being introduced into the draw production system 1100. The computations described herein may be performed on a variety of types of computational systems and the present disclosure is not limited to any particular computational scheme.

In view of the foregoing description, it should be understood that methods of classifying or ranking core canes based on metrics computed from a difference profile $\Delta_{diff}(r)=\Delta(r)-\Delta_{fit}(r)$ are disclosed. The classification schemes described herein beneficially take into account alpha deviation profiles associated with core canes that successfully produced MMFs conforming to an MMF standard. The metrics described herein that are used to classify the core canes have been pre-selected based on aspects of alpha deviation profile signatures that differentiate core canes successfully producing MMF standard compliant MMFs from core canes that are not successful in producing MMF standard compliant MMFs. For example, as described herein, a weighting function g(r) may be determined such that the $\tau_{err}$ metric described herein approximates a mode group delay difference (e.g., $\tau_6-\tau_1$) that differentiates non-OM4 compliant core canes from OM4 compliant core canes. Moreover, alpha deviation profile signatures were identified by averaging a plurality of difference profiles $\Delta_{diff}(r)$ associated with a plurality of core canes that successfully produced MMFs complying with the OM4 standard and another plurality of difference profiles $\Delta_{diff}(r)$ associated with another plurality of core canes that did not successfully produce MMFs complying with the OM4 standard. Such averaging of similar profiles enabled numerical ranges associated with the metrics described herein to be calculated such that core canes may be classified based on a likelihood of successful fabrication of MMF standard compliant fibers.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation; and; the number or type of embodiments described in the specification.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A method of classifying a core cane for use in forming a multimode optical fiber, the method comprising:
   determining a relative refractive index profile $\Delta(r)$ of the core cane;
   fitting the relative refractive index profile $\Delta(r)$ to an alpha profile $\Delta_{fit}(r)$ defined by $$\Delta_{fit}(r) = \Delta_{o,fit}\left(1 - \left(\frac{r}{a_{fit}}\right)^{\alpha_{fit}}\right)$$

where $\Delta_{o,fit}$ is a relative refractive index at a longitudinal centerline of the core cane, $\alpha_{fit}$ is a core shape parameter, and $a_{fit}$ is an outer radius of the core cane;
   generating a non-alpha residual profile $\Delta_{diff}(r) = \Delta(r) - \Delta_{fit}(r)$ for the core cane;
   computing one or more metrics from $\Delta_{diff}(r)$, and
   using the one or metrics in a classification of the core cane, the classification comprising a prediction of whether a bandwidth at a pre-determined wavelength of an optical fiber drawn from a preform comprising the core cane exceeds a pre-determined bandwidth at the pre-determined wavelength.

2. The method according to claim 1, wherein: the one or more metrics comprises one or more of:
   (i) $\Delta_{diff-sum, \ neg} = \int_{r=0}^{r=x+\alpha_{fit}} \Delta_{diff,neg}(r) \, dr$, where $x$ defines an analysis region and $\Delta_{diff,neg}$ is $\Delta_{diff}(r)$ multiplied by a weighting function $z(r)$ that is 1 when $\Delta_{diff}(r)$ is negative and 0 when $\Delta_{diff}(r)$ is positive;
   (ii) $\Delta_{diff-sum, \ pos} = \int_{r=0}^{r=x+\alpha_{fit}} \Delta_{diff,pos}(r) \, dr$, where $\Delta_{diff,pos}$ is $\Delta_{diff}(r)$ multiplied by a weighting function $y(r)$ that is 1 when $\Delta_{diff}(r)$ is positive and 0 when $\Delta_{diff}(r)$ is negative;
   (iii) a minimum negative value of $\Delta_{diff}(r)$ between $r=0$ and $r=x*a_{fit}$, $\Delta_{diff-neg, \ max}$;
   (iv) a maximum positive value of $\Delta_{diff}(r)$ between $r=0$ and $r=x*a_{fit}$, $\Delta_{diff-pos, \ max}$; and
   (v) a weighted summation $\tau_{err}$ computed by:

$$\tau_{err} = \int_{r=0}^{\alpha_{fit}} g(r) * \Delta_{diff}(r) \, dr$$

where $g(r)$ is a predetermined weighting function; and
   comparing the one or more computed metrics with corresponding metrics associated with core canes known to form optical fibers having a bandwidth greater than a predetermined bandwidth at a predetermined wavelength.

3. The method according to claim 2, wherein the one or more metrics further comprise a magnitude metric $PW_{err}$ computed by:

$$PW_{err} = \frac{1000}{\Delta_{o,fit}} \frac{\int_0^{a_{fit}} \Delta_{fit}(r) * r * |\Delta_{diff}(r)| \, dr}{\int_0^{a_{fit}} \Delta_{fit}(r) * r \, dr}.$$

4. The method according to claim 2, wherein the computing one or more metrics from $\Delta_{diff}(r)$ comprises computing each one of $\Delta_{diff-sum, \ neg}$, $\Delta_{diff-sum, \ pos}$, the minimum negative value, the maximum positive value, and $\tau_{err}$.

5. The method according to claim 2, wherein:
   the one or more computed metrics includes $\tau_{err}$, and
   the weighting function $g(r)$ is selected such that $g(r) * \Delta_{diff}(r)$ estimates a difference between two mode group delays of an optical fiber produced from the core cane.

6. The method according to claim 5, wherein the comparing the one or more computed metrics with the values associated with the core canes used to form the optical fibers comprises determining that $\tau_{err}$ has a negative value.

7. The method according to claim 1, further comprising generating a classification scheme for core canes using values of the one or more computed metrics associated with core canes used to form a plurality of optical fibers.

8. The method according to claim 7, wherein:
   the classification scheme comprises a plurality of bins, wherein each of the plurality of bins is defined by one or more numeral ranges associated with each of the one or more computed metrics,
   the plurality of bins comprises a highly rated bin generated using the values associated with the core canes used to form the optical fibers meeting the multimode fiber standard, and
   the comparing the one or more computed metrics with the values associated with the core canes used to form the optical fibers comprises determining whether the core cane satisfies the one or more numerical ranges associated with the highly rated bin.

9. The method according to claim 8, further comprising:
   determining that the core cane does not meet the one or more numeral ranges associated with the highly rated bin; and
   discarding the optical preform.

10. The method according to claim 1, further comprising comparing the relative refractive index profile $\Delta(r)$ to a target refractive index profile that deviates from the alpha profile $\Delta_{fit}(r)$.

11. The method according to claim 1, wherein the pre-determined bandwidth and the pre-determined wavelength are defined by a multimode fiber standard.

12. The method according to claim 11, wherein the multimode fiber standard is an OM4 standard.

13. The method according to claim 1, wherein the fit for $\Delta_{fit}(r)$ is a least squares fit using a weighting function w(r) different from 1.

14. The method according to claim 1, wherein the fit for $\Delta_{fit}(r)$ is a least squares fit using two weighting functions $w_1(r)$ and $w_2(r)$ and one or more metrics computed from $\Delta_{fit1}(r)$ and $\Delta_{fit2}(r)$ and comprises an alpha profile difference metric $\alpha_{diff}$ computed by:

$$\alpha_{diff}=\alpha_1-\alpha_2$$

where $\alpha_1$ and $\alpha_2$ comprise different values of $\alpha_{fit}$ obtained using different weighting functions while fitting the relative refractive index profile $\Delta(r)$ to the alpha profile $\Delta_{fit1}(r)$ using $w_1(r)$ and $\Delta_{fit2}(r)$ using $w_2(r)$.

15. A method of fabricating a multimode optical fiber, the method comprising:

fabricating a core cane comprising an up-dopant concentration that varies from a centerline of the core cane to an outer radius of the core cane in accordance with a predetermined relative refractive index profile $\Delta_r(r)$ for the core cane;

measuring a relative refractive index profile $\Delta(r)$ of the core cane;

fitting the relative refractive index profile $\Delta(r)$ to an alpha profile $\Delta_{fit}(r)$ defined by $$\Delta_{fit}(r) = \Delta_{o,fit}\left(1 - \left(\frac{r}{a_{fit}}\right)^{\alpha_{fit}}\right)$$

where $\Delta_{o,fit}$ is a relative refractive index at the longitudinal centerline and $a_{fit}$ is an outer radius of the core cane;

generating a non-alpha residual profile $\Delta_{diff}(r)=\Delta(r)-\Delta_{fit}(r)$ for the core cane;

determining that the core cane meets one or more selection criteria based on $\Delta_{diff}(r)$, wherein the one or more selection criteria comprise one or more numerical ranges associated with one or more of a plurality of selection parameters, wherein the plurality of selection parameters comprises:

(i) $\Delta_{diff-sum,\ neg}=\int_{r=0}^{r=x+a_{fit}}\Delta_{diff,neg}(r)\ dr$, where x defines an analysis region and $\Delta_{diff,neg}$ is $\Delta_{diff}(r)$ multiplied by a weighting function z(r) that is 1 when $\Delta_{diff}(r)$ is negative and 0 when $\Delta_{diff}(r)$ is positive;

(ii) $\Delta_{diff-sum,\ pos}=\int_{r=0}^{r=x+a_{fit}}\Delta_{diff,pos}(r)\ dr$, where $\Delta_{diff,pos}$ is $\Delta_{diff}(r)$ multiplied by a weighting function y (r) that is 1 when $\Delta_{diff}(r)$ is positive and 0 when $\Delta_{diff}(r)$ is negative;

(iii) a minimum negative value of $\Delta_{diff}(r)$ between r=0 and r=x*$a_{fit}$, $\Delta_{diff-neg,\ max}$;

(iv) a maximum positive value of $\Delta_{diff}(r)$ between r=0 and r=x*$a_{fit}$, $\Delta_{diff-pos,\ max}$; and (v) a weighted summation $\tau_{err}$ computed by $$\tau_{err}=\int_{r=0}^{a_{fit}}g(r)*\Delta_{diff}(r)dr$$

where g(r) is a predetermined weighting function; and in response to determining that the core cane meets the one or more selection criteria, either discarding the core cane from further processing or selecting the core cane for the further processing into the multimode optical fiber.

16. The method according to claim 15, wherein the further processing comprises:

depositing a cladding layer onto an exterior surface of the core cane to form a fiber pre-form; and drawing the fiber pre-form into the multimode optical fiber.

17. The method according to claim 15, wherein:

the one or more selection criteria comprises a numerical range for $\tau_{err}$, and the weighting function g(r) is selected such that g(r)*$\Delta_{diff}(r)$ estimates a difference between two mode group delays of an optical fiber produced from the core cane.

18. The method according to claim 15, wherein the numerical range for $\tau_{err}$ comprises negative values, the negative values being associated with selecting the core cane for further processing into the multimode optical fiber.

19. The method according to claim 15, further comprising generating the one or more selection criteria by:

fabricating a plurality of core canes;

determining one or more of $\Delta_{diff-sum,\ neg}$, $\Delta_{diff-sum,\ pos}$, the minimum negative value, the maximum positive value, and $\tau_{err}$, for each of the plurality of core canes;

processing each of the plurality of core canes to form a plurality of multimode optical fibers;

determining which ones of the plurality of multimode optical fibers satisfy a multimode fiber standard, and establishing the one or more numerical ranges of the one or more selection criteria based on the ones of the plurality of multimode optical fibers that satisfy the multimode fiber standard.

20. A method of ranking a core cane among a plurality of optical core canes for use in forming a multimode optical fiber, the method comprising:

determining a relative refractive index profile $\Delta(r)$ of the core cane;

fitting the relative refractive index profile $\Delta(r)$ to an alpha profile $\Delta_{fit}(r)$ defined by $$\Delta_{fit}(r) = \Delta_{o,fit}\left(1 - \left(\frac{r}{a_{fit}}\right)^{\alpha_{fit}}\right)$$

where $\Delta_{o,\ fit}$ is a relative refractive index at a longitudinal centerline of the core cane;

generating a non-alpha residual profile $\Delta_{diff}(r)=\Delta(r)-\Delta_{fit}(r)$ for the core cane; and classifying the core cane based on $\Delta_{diff}(r)$ by computing a plurality of selection parameters from $\Delta_{diff}(r)$, wherein the plurality of selection parameters comprises two or more of:

(i) $\Delta_{diff-sum,\ neg}=\int_{r=0}^{r=x+a_{fit}}\Delta_{diff,neg}(r)\ dr$, where x defines an analysis region and $\Delta_{diff,neg}$ is $\Delta_{diff}(r)$ multiplied by a weighting function z(r) that is 1 when $\Delta_{diff}(r)$ is negative and 0 when $\Delta_{diff}(r)$ is positive;

(ii) $\Delta_{diff-sum,\ pos}=\int_{r=0}^{r=x+a_{fit}}\Delta_{diff,pos}(r)\ dr$, where $\Delta_{diff,pos}$ is $\Delta_{diff}(r)$ multiplied by a weighting function y (r) that is 1 when $\Delta_{diff}(r)$ is positive and 0 when $\Delta_{diff}(r)$ is negative;

(iii) a minimum negative value of $\Delta_{diff}(r)$ between r=0 and r=x*$a_{fit}$, $\Delta_{diff-neg,\ max}$;

(iv) a maximum positive value of $\Delta_{diff}(r)$ between r=0 and r=x*$a_{fit}$, $\Delta_{diff\text{-}pos, max}$; and (v) a weighted summation $\tau_{err}$ computed by $$\tau_{err} = \int_{r=0}^{a_{fit}} g(r) * \Delta_{diff}(r) dr$$

where g(r) is a predetermined weighting function.

* * * * *